(12) United States Patent
Yamamura et al.

(10) Patent No.: US 7,440,823 B2
(45) Date of Patent: *Oct. 21, 2008

(54) INTENTION ESTIMATION METHOD AND SYSTEM WITH CONFIDENCE INDICATION

(75) Inventors: Tomohiro Yamamura, Yokohama (JP); Nobuyuki Kuge, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 624 days.

This patent is subject to a terminal disclaimer.

(21) Appl. No.: 11/012,165

(22) Filed: Dec. 16, 2004

(65) Prior Publication Data

US 2005/0131589 A1 Jun. 16, 2005

(30) Foreign Application Priority Data

Dec. 16, 2003 (JP) ............................ P2003-417746

(51) Int. Cl.
*G05D 1/00* (2006.01)
(52) U.S. Cl. ............................... 701/1; 701/28; 701/29; 701/117; 180/168
(58) Field of Classification Search .................. 701/1, 701/23, 28, 41, 42, 88, 93, 117; 180/167–169
See application file for complete search history.

(56) References Cited

U.S. PATENT DOCUMENTS

| | | | |
|---|---|---|---|
| 5,189,621 A | 2/1993 | Onari et al. | |
| 5,485,892 A | 1/1996 | Fujita | |
| 5,521,579 A | 5/1996 | Bernhard | |
| 5,546,305 A | 8/1996 | Kondo | |
| 5,776,031 A | 7/1998 | Minowa et al. | |
| 5,790,403 A | 8/1998 | Nakayama | |
| 5,906,560 A | 5/1999 | Minowa et al. | |
| 5,908,457 A | 6/1999 | Higashira et al. | |
| 5,911,771 A | 6/1999 | Reichart et al. | |
| 6,049,749 A | 4/2000 | Kobayashi | |
| 6,057,754 A | 5/2000 | Kinoshita et al. | |
| 6,092,005 A | 7/2000 | Okada | |
| 6,092,014 A | 7/2000 | Okada | |
| 6,092,619 A | 7/2000 | Nishikawa et al. | |
| 6,138,062 A | 10/2000 | Usami | |

(Continued)

FOREIGN PATENT DOCUMENTS

DE 19620929 A1 11/1997

(Continued)

OTHER PUBLICATIONS

U.S. Appl. No. 11/012,208, filed Dec. 16, 2004, Kuge et al.

(Continued)

*Primary Examiner*—Gertrude Arthur Jeangla
(74) *Attorney, Agent, or Firm*—McDermott Will & Emery LLP

(57) ABSTRACT

An intention estimation system and method with confidence indication for providing operation assistance based on an operator's intention. A current operation performed by the operator is detected, and data related to an estimated intention of the operator is generated based on the detected operation. A confidence index of the estimated intention of the operator is then determined. The confidence index indicates, for example, the reliability or strength of the estimated intention. An operation assistance may be provided based on the estimated intention and the confidence index.

22 Claims, 13 Drawing Sheets

U.S. PATENT DOCUMENTS

| | | | |
|---|---|---|---|
| 6,178,365 | B1 | 1/2001 | Kawagoe et al. |
| 6,185,492 | B1 | 2/2001 | Kagawa et al. |
| 6,240,357 | B1 | 5/2001 | Bastian |
| 6,278,362 | B1 | 8/2001 | Yoshikawa et al. |
| 6,294,987 | B1 | 9/2001 | Matsuda et al. |
| 6,388,565 | B1 | 5/2002 | Bernhard et al. |
| 6,393,361 | B1 | 5/2002 | Yano et al. |
| 6,463,369 | B2 | 10/2002 | Sadano et al. |
| 6,489,887 | B2 | 12/2002 | Satoh et al. |
| 6,493,619 | B2 | 12/2002 | Kawazeo et al. |
| 6,675,094 | B2 | 1/2004 | Russell et al. |
| 2002/0013650 | A1 | 1/2002 | Kusafuka et al. |
| 2002/0128751 | A1 | 9/2002 | Engstrom et al. |
| 2003/0060936 | A1 | 3/2003 | Yamamura et al. |
| 2003/0233902 | A1 | 12/2003 | Hijikata |
| 2003/0236608 | A1 | 12/2003 | Egami |
| 2004/0172185 | A1 | 9/2004 | Yamamura et al. |

FOREIGN PATENT DOCUMENTS

| | | | |
|---|---|---|---|
| EP | 1197683 | A2 | 4/2002 |
| EP | 1375280 | A2 | 6/2002 |
| EP | 1285842 | A2 | 8/2002 |
| EP | 1 256 479 | A1 | 11/2002 |
| EP | 1426230 | A2 | 11/2002 |
| EP | 1357013 | A1 | 3/2003 |
| EP | 1 347 214 | A2 | 9/2003 |
| EP | 1347214 | A2 | 11/2003 |
| FR | 2 838 386 | | 10/2003 |
| JP | 11-099846 | | 4/1999 |
| JP | 11-202049 | | 7/1999 |
| JP | 2000-105898 | | 4/2000 |
| JP | 2001-260703 | | 9/2001 |
| JP | 2002-331850 | | 11/2002 |
| JP | 2003-205760 | | 7/2003 |
| JP | 2004-270718 | | 9/2004 |

OTHER PUBLICATIONS

U.S. Appl. No. 11/012,158, filed Dec. 16, 2004, Kuge et al.
U.S. Appl. No. 11/012,208, filed Dec. 16, 2004, Nobuyuki Kuge., et al.
U.S. Appl. No. 11/012,158, filed Dec. 16, 2004, Nobuyuki Kuge., et al.
Japanese Office Action, with English Translation, issued in Japanese Patent Application No. JP 2003-417746 dated on Jun. 24, 2008.

Upon determination that the lane change continues:

terminate  Upon failure to determine that the lane change continues:

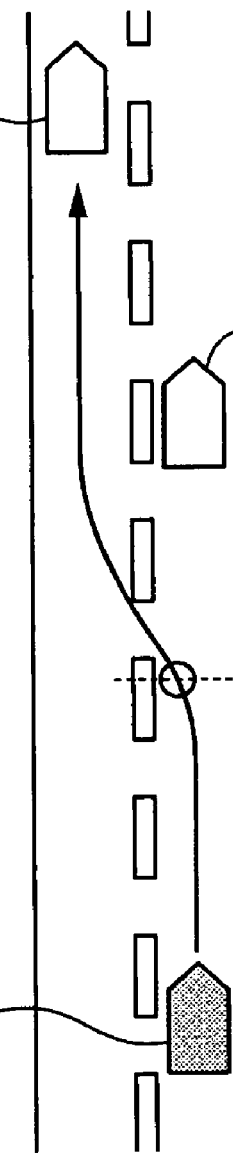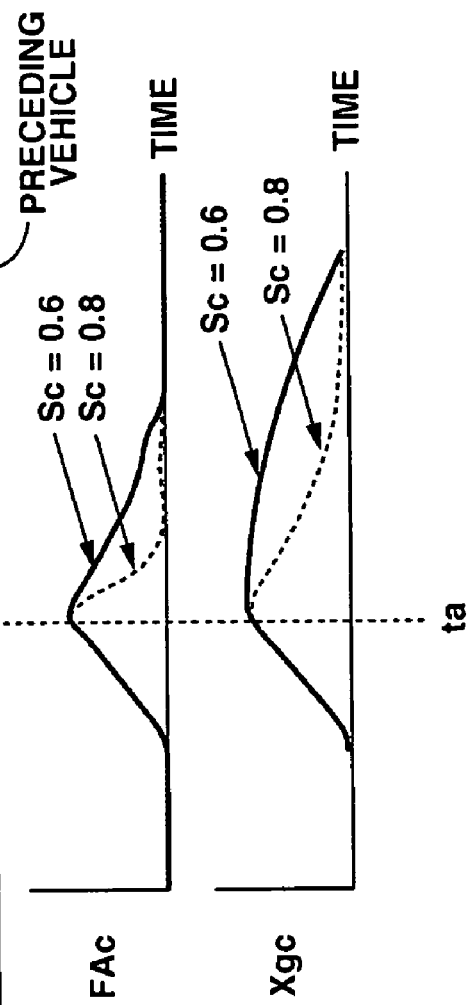
FIG.17(a)
FIG.17(b)
FIG.17(c)

INTENTION ESTIMATION METHOD AND SYSTEM WITH CONFIDENCE INDICATION

RELATED APPLICATIONS

The present application claims the benefit of priority from Japanese patent application No. 2003-417746, filed Dec. 16, 2003, the disclosure of which is incorporated herein by reference in its entirety.

FIELD OF THE DISCLOSURE

The present disclosure relates to estimation of an operator's intention and providing operation assistance, and more particularly, to a driver's intention estimation method and system with a confidence indication.

BACKGROUND OF THE DISCLOSURE

A number of methods and systems have been proposed for providing assistance in operating a device, system or machine, such as a vehicle. For example, several driving assistance systems were disclosed in U.S. Published Patent Application Nos. 20030060936 A1, published Mar. 27, 2003, and 20040172185 A1, published Sep. 2, 2004. In order to enhance performance, some driving assistance systems may require estimation of a driver's intention in driving a vehicle. A system for estimating a driver's intention may collect estimates of the driver's intention using movement of the driver's eyeballs. For example, directions to which the driver's eyeballs turn are projected onto a plane divided into a number of regions, for calculating a distribution of projected directions over the divided regions to estimate the driver's intention. However, such type of systems lacks accuracy because the driver's eyeballs move all the time and do not always relate to a "driving" intention of the driver.

Therefore, there is a need for reliable intention estimation systems that can estimate an operator's intention with satisfactory accuracy. There is also a need for determining how reliable or how strong an estimated intention is, such that operation assistance can be provided accordingly.

SUMMARY OF THE DISCLOSURE

This disclosure presents system, control process and method that provide effective estimation of an operator's intention in operating a device, system or machine, and providing a confidence index to indicate the reliability or degree of confidence of the estimated intention of the operator. Operation assistance may be provided based on the confidence index. The advantages, operations and detailed structures of the disclosed methods and systems will be appreciated and understood from the descriptions provided herein.

An exemplary system according to this disclosure detects an operation performed by an operator of a machine, and generates data related to an estimated intention to approximate the intention of the operator based on the detected operation. The operation may correspond to multiple possible intentions retained by the operator. A confidence calculator is provided to determine a confidence index of the estimated intention. For instance, the confidence index may represent a period of time that the operator has retained the estimated intention. The longer the operator retains the intention, the more determined the operator is to perform an action or operation according to the estimated intention.

The estimated intention may be obtained using various approaches. In one embodiment, an intention estimation device is provided to calculate an estimated intention of the operator. In one aspect, the intention estimation device includes a first device configured to provide data related to a plurality of imaginary operators, each of the plurality of imaginary operators associated with at least one intention, wherein each of the at least one intention is associated with an operation of the respective imaginary operator; and a second device configured to calculate a likelihood value for each of the plurality of imaginary operators based on the detected operation of the operator and the respective associated operation of each of the plurality of imaginary operators. An additional third device is provided to generate the estimated intention of the operator based on the respective likelihood value of each of the plurality of imaginary operators. The confidence calculator may calculate the confidence index of the estimated intention based on the respective likelihood value of each of the plurality of imaginary operators.

In another aspect, the intention estimation device generates the estimated intention of the operator based on the detected operation of the driver and reference data related to predetermined operation patterns. The intention estimation device may generate the estimated intention by applying one of a support vector machine and a relevance vector machine to data related to the detected operation and the reference data related to the predetermined operation patterns.

According to one embodiment of this disclosure, a control device is provided to regulate the operation of an operation device of a the machine based on the confidence index. A vehicle may implement a system according to this disclosure to regulate the operation of an operation device of the vehicle, such as an accelerator pedal or a braking system. The control device modifies a reaction force of the accelerator pedal of the vehicle or a deceleration force of the braking system. According to another embodiment, the vehicle includes a risk calculation device configured to calculate a risk potential associated with the vehicle. The operation device of the vehicle is regulated based on the calculated risk potential associated with the vehicle and the confidence index. In one aspect, the control device modifies the risk potential based on the confidence index, and regulates the operation of the operation device based on the modified risk potential. In another aspect, the control device calculates a regulation amount to regulate the operation of the operation device based on the risk potential, and modifies the calculated regulation amount based on the confidence index.

The system and method described herein may be implemented using one or more data processing devices, such as controllers or microcomputers, executing software programs and/or microcode.

Additional advantages of the present disclosure will become readily apparent to those skilled in this art from the following detailed description, wherein only the illustrative embodiments are shown and described, simply by way of illustration of the best mode contemplated. As will be realized, the disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which:

FIG. 17(a) illustrates a traffic scene in which a vehicle changes lanes to pass the preceding vehicle.

FIG. 17(b) illustrates a corrected accelerator pedal reaction force instruction value FAc in response to the estimated driver's lane-change intention.

FIG. 17(c) illustrates varying a corrected deceleration instruction value Xgc in response to the estimated driver's lane-change intention.

DETAILED DESCRIPTION OF THE DISCLOSURE

In the following description, for the purposes of explanation, numerous specific details are set forth in order to provide a thorough understanding of the present disclosure. It will be apparent, however, to one skilled in the art that the present method and system may be practiced without these specific details. In other instances, well-known structures and devices are shown in block diagram form in order to avoid unnecessarily obscuring the present disclosure. For illustration purpose, the following examples describe the operation of an exemplary tester used for evaluating a circuit of an automotive vehicle. It is understood that the use of tester is not limited to vehicle circuits. The tester also can be used in other types of electrical circuits.

First Exemplary Implementation of the Disclosure

Figure 1A:
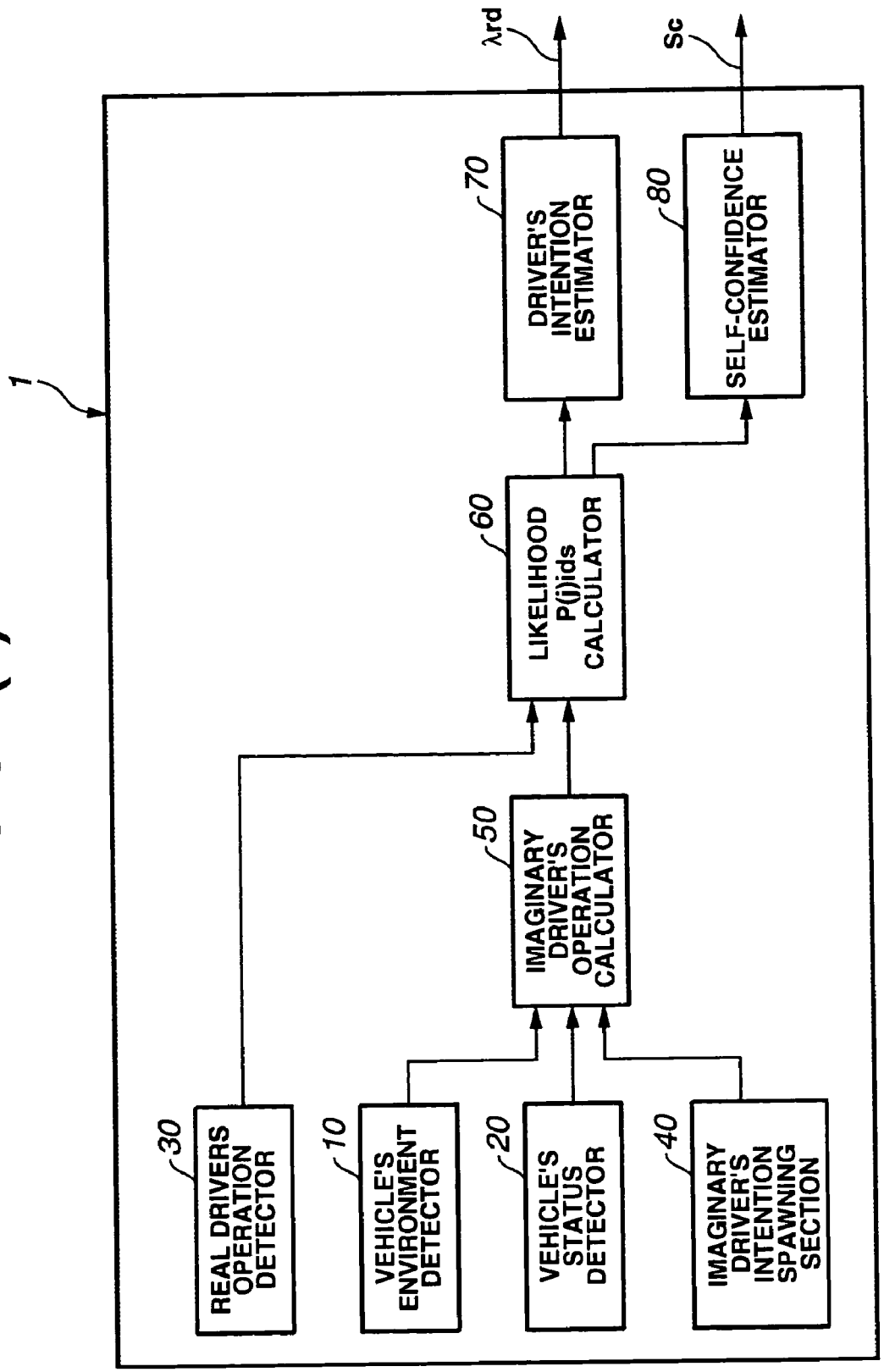
FIG. 1(a) is a block diagram illustrating an exemplary implementation of an intention estimation system according to the present disclosure.

Referring to FIG. 1(a), an exemplary intention estimation system 1 for a vehicle includes a vehicle's environment detector 10, a vehicle's status detector 20, a real driver's operation detector 30, an imaginary driver's intention generating section 40, an imaginary driver's operation calculator 50, a likelihood P(j)ids calculator 60, a driver's intention estimator 70, and a confidence index estimator 80. The vehicle's environment detector 10 detects a state of environment surrounding the vehicle. The vehicle's status detector 20 detects a status of the vehicle. The real driver's operation detector 30 detects an operation amount of a real driver in driving the vehicle.

The driver's intention estimating system 1 has access to reference data, such as data related to a plurality of imaginary drivers. In operating an operation device of the vehicle, such as an acceleration pedal or steering wheel, each imaginary driver is designed to perform an operation of the vehicle according to an associated intention. Examples of the intention include a lane-keeping intention (LK), a lane-change intention to the right (LCR), and a lane-change intention to the left (LCL). As will be described later in connection with FIGS. 4, 5(a), and 5(b), the imaginary driver's intention generating section 40 continuously generates a lane-keeping intention (LK) at every point in time to form a series of intentions for a parent imaginary driver. Furthermore, the imaginary driver's intention generating section 40 generates data related to at least one additional imaginary driver based on the intention of the parent imaginary driver. In one embodiment, the imaginary driver's intention generating section 40 generates data related to two additional imaginary drivers, each has one of two derivative lane-change intentions (LCR) and (LCL) based on a lane-keeping intention (LK) of the parent imaginary driver at an immediately preceding point in time. In another embodiment, the imaginary driver's intention generating section 80 applies special rules in generating series of intentions for the additional imaginary drivers.

The imaginary driver's intention generating section 40 allows a parent imaginary driver to retain a lane-keeping intention (LK) at every point in time. Further, at every point in time with the parent imaginary driver having a lane-keeping intention (LK), the imaginary driver's intention generating section 40 generates data related to two additional imaginary drivers having lane-change intentions to the right (LCR) and to the left (LCL), respectively, for the next point in time. In one embodiment, an additional imaginary driver generated at a specific point of time assumes at least some of the intentions for all points of time preceding the specific point in time, from the parent imaginary driver.

Moreover, the imaginary driver's intention generating section 40 determines whether or not an imaginary driver retaining one of the derivative lane-change intentions to exist at the next point in time should be allowed to continue to exist, by applying one or more rules. For instance, an exemplary rule allows the parent imaginary user to retain a lane-keeping intention (LK) at every point in time, and generates data related to two additional imaginary drivers having lane-change intentions (LCR) and (LCL), respectively, at the next point in time. According to another exemplary rule, an imaginary driver is allowed to retain a lane-change intention to the right (LCR) at the next point in time if it is determined that the real driver continues to retain a lane-changing intention at the present point in time. On the other hand, if it is determined that at a specific point in time, the real driver no longer wants to change lanes or has just changed lanes, an imaginary driver is not allowed to retain a lane-change intention to the right (LCR) at the next point in time. This is equally applicable to a lane-change intention to the left (LCL). Accordingly, an imaginary driver having a lane-change intention to the left (LCL) at a specific point in time is allowed to retain a lane-change intention to the left (LCL) at the next point in time upon determination that a lane change continues, but the imaginary driver is not allowed to continue to retain a lane-change intention to the left (LCL) at a specific point in time upon failure to determine that the lane change continues. Therefore, an imaginary driver that has one of the derivative lane-change intentions (LCR) and (LCL), is allowed to retain the derivative lane-change intention at the next point in time upon determination that a lane change continues.

At each point in time, each of the imaginary drivers has an associated operation corresponding to an intention retained by that imaginary driver. The process for determining an operation associated with each intention is described below.

The vehicle's environment detector 10 provides information on a state of environment around the vehicle to the imaginary driver's operation calculator 50. Examples of such information include a lateral distance y of the vehicle from a centerline within a lane, and a yaw angle ψ of the vehicle with respect a line parallel to the centerline. The vehicle's status detector 20 provides information on a status of the vehicle to the imaginary driver's operation calculator 50. Examples of such information include a vehicle speed of the vehicle and a steering angle of the vehicle.

The imaginary driver's operation calculator 50 calculates operation amounts Oid of the imaginary drivers in a manner that will be described in detail in connection with FIG. 3. In order to reduce the computation load, certain rules are applied to determine whether an existing additional imaginary driver retaining one or the derivative lane-change intentions should be allowed to exist at the next point in time. In other words, thief a predetermined condition established by the rules is not met by an additional imaginary driver at a specific point in time, that additional imaginary driver is terminated or eliminated. Since it is not necessary to calculate operation amounts Oid of the eliminated imaginary drivers, the computation load is reduced.

The imaginary driver's operation calculator 50 provides the calculated operation amounts Oid of the imaginary drivers to the likelihood value P(j)ids calculator 60. For comparison with each of the calculated operation amounts Oid of the imaginary drivers, the real driver's operation detector 30 provides a detected operation amount Ord to the likelihood value P(j)ids calculator 60. An example of the operation amount to be detected is a steering angle of the vehicle.

The likelihood value P(j)ids calculator 60 calculates a likelihood value Pid(j)(t) of an imaginary driver, based on the associated operation amounts Oid and the detected operation amount Ord. The calculated likelihood values Pid(j)(t) are stored in data storage devices, such as memory or hard disk. For each imaginary driver, the data storage device stores the most recently calculated likelihood value Pid(j)(t) after shifting the previously calculated likelihood value. The stored likelihood values may be represented in the form of Pid(j)(t), Pid(j)(t−1), . . . , Pid(j)(t−m+1), which correspond to likelihood values calculated at different points in time ranging from time (t) back to time (t−m+1). The m, in number, points in time are arranged at regular intervals and define a predetermined period of time.

The likelihood value P(j)ids calculator 60 calculates a collective likelihood value P(j)ids for each imaginary driver j based on likelihood values Pid(j)(t), Pid(j)(t−1), . . . , Pid(j)(t−m+1) and provides the calculated series-likelihood values P(j)ids for processing at the driver's intention estimator 70.

In one embodiment, the driver's intention estimator 70 selects one of the imaginary drivers to approximate behaviors of the real driver based on the calculated collective likelihood values P(j)ids. An intention of the selected imaginary driver is set as an estimated driver's intention λrd.

The confidence index estimator 80 estimates a confidence index of the estimated intention of the real driver.

With continuing reference to FIG. 1(a), the vehicle's environment detector 10 includes a front camera that covers a field of front view and a yaw angle sensor. The front camera acquires image on road conditions, for example, within the field of front view. The vehicle's environment detector 10 detects a lateral distance y of the vehicle from a centerline within a lane, and a yaw angle ψ of the vehicle with respect a line parallel to the centerline. The vehicle's environment detector 10 is equipped with an image processor that processes the acquired image. The vehicle's status detector 20 includes a vehicle speed sensor for detecting a speed of the vehicle. The real driver's operation detector 30 includes a sensor to detect an operation performed by the driver. Detector 30 may be a steering angle sensor that detects a steering angle of the vehicle. Other types of sensor also can be used, such as an acceleration sensor or brake sensor.

In the exemplary implementation, an exemplary system includes imaginary driver's intention generating section 40, imaginary driver's operation calculator 50, likelihood value P(j)ids calculator 60, driver's intention estimator 70, and confidence index estimator 80. Some or all of these elements are implemented using one or more microcomputers or microcontrollers, such as a central processor unit (CPU), executing microcode, software programs, and/or instructions. The microcode and/or software reside in volatile and/or non-volatile data storage devices and/or machine-readable data storage medium such as read only memory (ROM) devices, random access memory (RAM) devices, SRAM, PROM, EPROM, CD-ROM, disks, carrier waves, etc.

As described before, the imaginary driver's intention generating section 40 continuously generates data related to imaginary drivers. Each of the imaginary drivers retains a series of intentions over a period of time that the number of the imaginary drivers and the types of intentions retained by the imaginary drivers are dynamic and may change over time.

As described before, the imaginary driver's operation calculator 50 calculates operation amounts Oid of the imaginary drivers associated with different intentions that are determined by the imaginary driver's intention generating section 40.

The real driver's intention estimator 70 determines an estimated intention of the real driver after comparing the likelihood values of the imaginary drivers, which are calculated based on the operation amounts for each imaginary driver over a period of time and the operation amount of the real driver detected over the same period of time.

The confidence index estimator 80 estimates a confidence index for the estimated intention of the real driver.

Figure 1B:
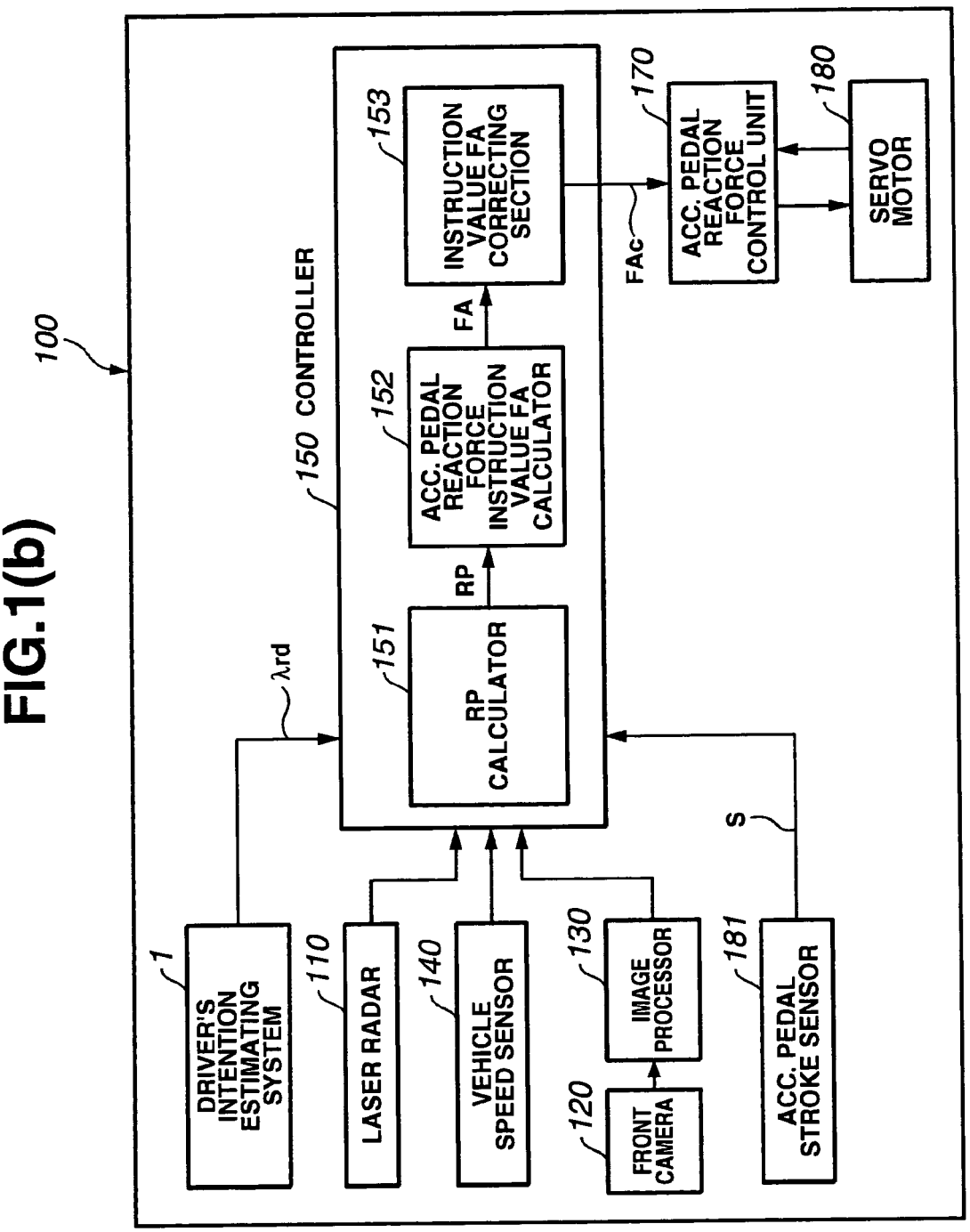
FIG. 1(b) is a block diagram illustrating another exemplary implementation of an operation assistance system according to the present disclosure.
Figure 11:
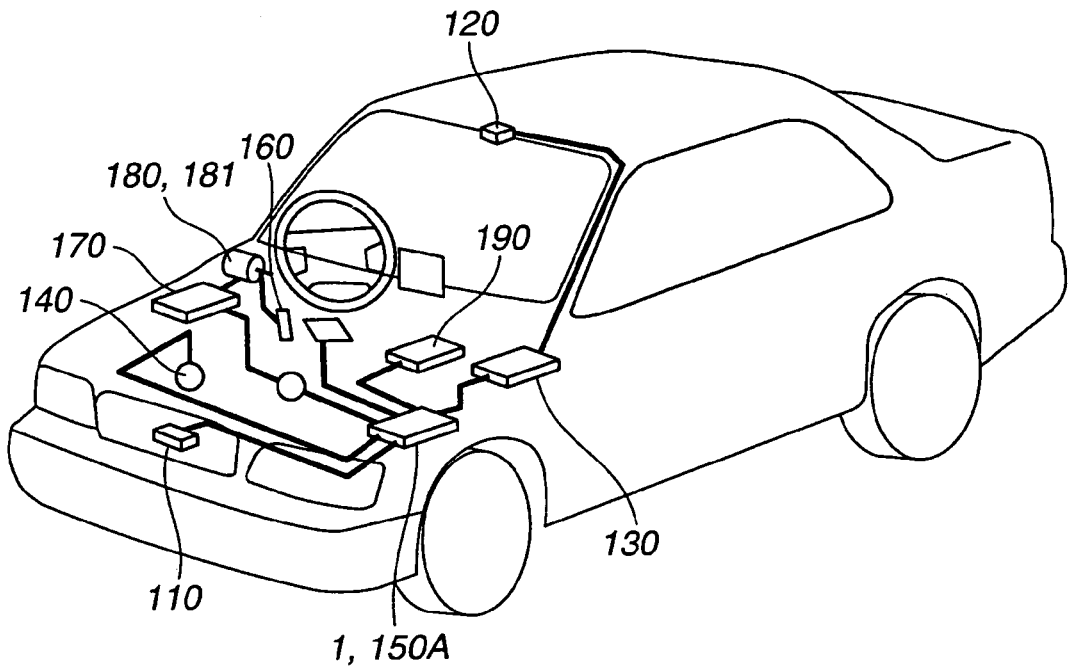
FIG. 11 is a perspective view a vehicle in the form of an automobile incorporating the driver assisting system.
Figure 12:
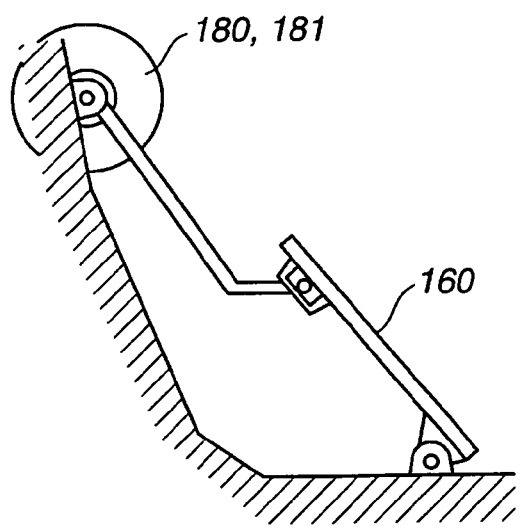
FIG. 12 is an illustration of an operation, in the form of an accelerator pedal, of the vehicle.

Referring to FIGS. 1(b), 11 and 12, a driver assisting system 100 is described.

For better understanding of the driver assisting system, reference should be made to U.S. Published Patent Application No. 2003/0060936 A1, published Mar. 27, 2003, which is incorporated herein by reference in its entirety.

The driver assisting system 100 includes a laser radar 110. The laser radar 110 is mounted to an automobile at a front bumper or a front grille thereof. Lacer radar 110 scans horizontally and laterally about 6 degrees to each side of an axis parallel to the vehicle longitudinal centerline, propagates infrared pulses forwardly and receives the reflected radiation by an obstacle, such as, a rear bumper of a preceding vehicle. The laser radar 110 can provide a distance d to a preceding vehicle in front and a relative speed Vr to the preceding vehicle. The laser radar 110 provides, as outputs, the detected distance d and relative speed Vr to a controller 150. The driver assisting system 100 also includes a front camera 120. The front camera 120 is CCD type or CMOS type, and mounted to the vehicle in the vicinity of the rear view mirror to acquire image data of a region in front of the vehicle as shown in FIG. 11. The front camera 120 provides, as output signals, the acquired image data to an image processor 130. The image processor 130 provides the processed image data to the controller 150. The region covered by the front camera 120 extends from the camera axis to each side by 30 degrees.

The driver assisting system 100 also includes a vehicle speed sensor 140. The vehicle speed sensor 140 determines a vehicle speed of the host vehicle by processing outputs from wheel speed sensors. The vehicle speed sensor 140 may include an engine controller or a transmission controller, which can provide a signal indicative of the vehicle speed. The vehicle speed sensor 140 provides, as an output, the vehicle speed of the host vehicle to the controller 150.

The driver assisting system 100 also includes a driver's intention estimating system 1 as illustrated in FIG. 1(a) to provide an estimated real driver's intention λrd and a confidence index Sc to the controller 150.

The controller 150, which performs data processing within the driver assisting system 100, may contain a microprocessor including a central processing unit (CPU), a read only memory (ROM), and a random access memory (RAM). The controller 150 includes, for example, software implementation of a risk potential (RP) calculator 151, an accelerator pedal reaction force instruction value FA calculator 152, and an instruction value FA correcting section 153.

The RP calculator 151 calculates a risk potential (RP) associated with the vehicle based on the vehicle's environment using a vehicle speed V1 of the host vehicle, a distance D to the preceding vehicle, and a relative speed Vr to the preceding vehicle, which are provided by the laser radar 110, vehicle speed sensor 140 and image processor 130. The RP calculator 151 provides, as an output, the risk potential RP to the accelerator pedal reaction force instruction value FA calculator 152.

The accelerator pedal reaction force instruction value FA calculator 152 calculates an accelerator pedal reaction force instruction value FA based on the risk potential RP. The accelerator pedal reaction force instruction value FA calculator 152 provides, as an output, the accelerator pedal reaction force instruction value FA to the instruction value FA correcting section 153.

The instruction value FA correcting section 153 corrects the accelerator pedal reaction force instruction value FA based on the estimated driver's intention λrd and the confidence index Sc, and generates a corrected accelerator pedal reaction force instruction value FAc. The instruction value FA correcting section 153 provides, as an output, the corrected accelerator pedal reaction force instruction value FAc to an accelerator pedal reaction force control unit 170.

In response to the corrected accelerator pedal reaction force instruction value FAc, the accelerator pedal reaction force control unit 170 regulates a servo motor 180 of an accelerator pedal 160 (see FIG. 12). As shown in FIG. 12, the accelerator pedal 160 has a link mechanism including a servo motor 180 and an accelerator pedal stroke sensor 181. The servo motor 180 may provide any desired torque and any desired angular position in response to an instruction from the accelerator pedal reaction force control unit 170. The accelerator pedal stroke sensor 181 detects an accelerator pedal stroke or position S of the accelerator pedal 160 by measuring an angle of the servo motor 180. The angle of the servo motor 180 corresponds to the accelerator pedal stroke S because the servo motor 180 and the accelerator pedal 160 are interconnected by the link mechanism.

For better understanding of the accelerator pedal of the above kind, reference are made to U.S. Published Patent Application No. 2003/0236608 A1 (published Dec. 25, 2003) and 2003/0233902 A1 (published Dec. 25, 2003), both of which are incorporated herein by reference in their entireties.

When the accelerator pedal reaction force control unit 170 is not active, the reaction force increases linearly as the accelerator pedal stroke S increases. This reaction force varying characteristic is accomplished by a spring force provided by a torque spring arranged at the center of rotational movement of the accelerator pedal 160.

Figure 2:
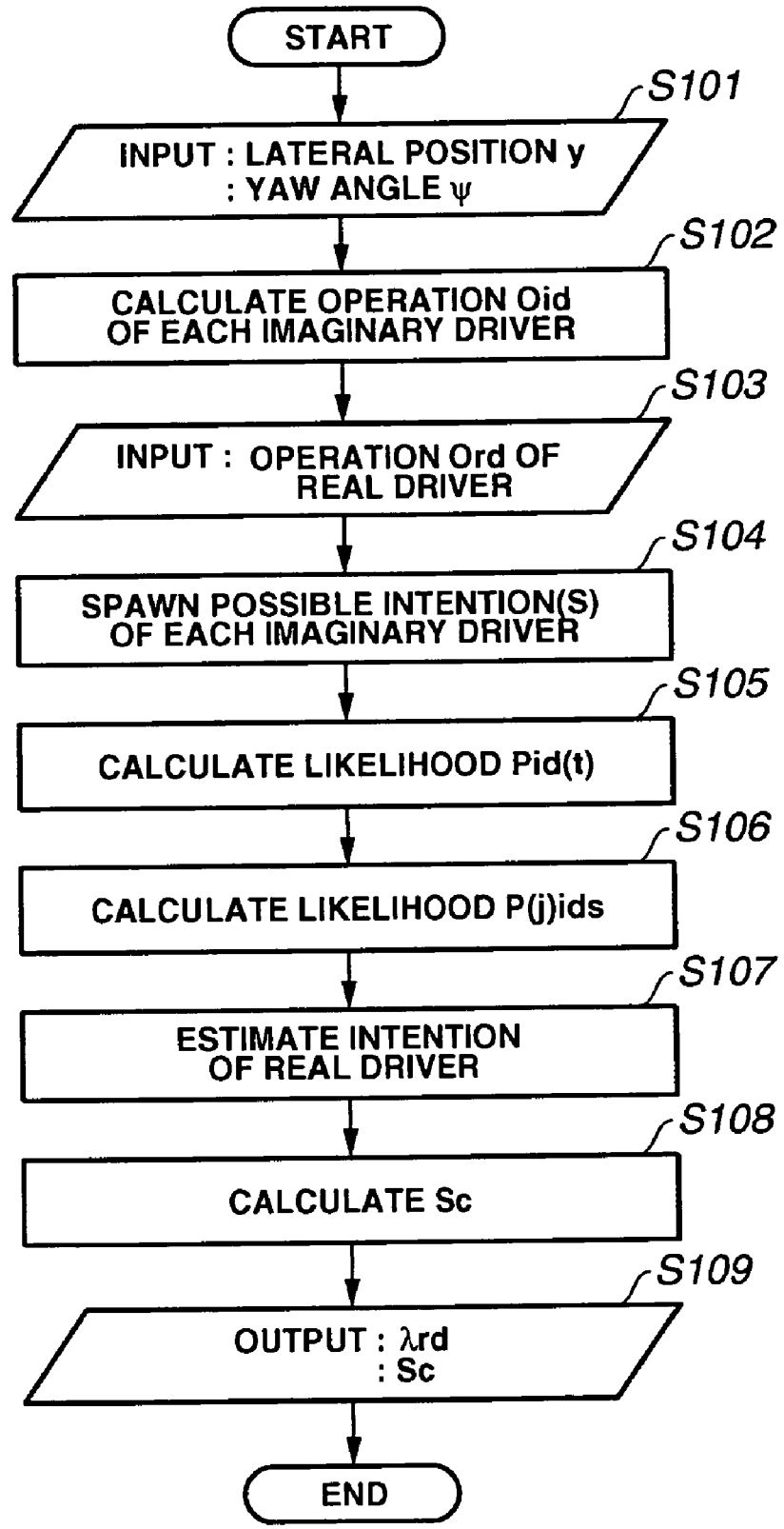
FIG. 2 is a flow chart illustrating operation of the intention estimation system illustrated in FIG. 1(a).
Figure 3:
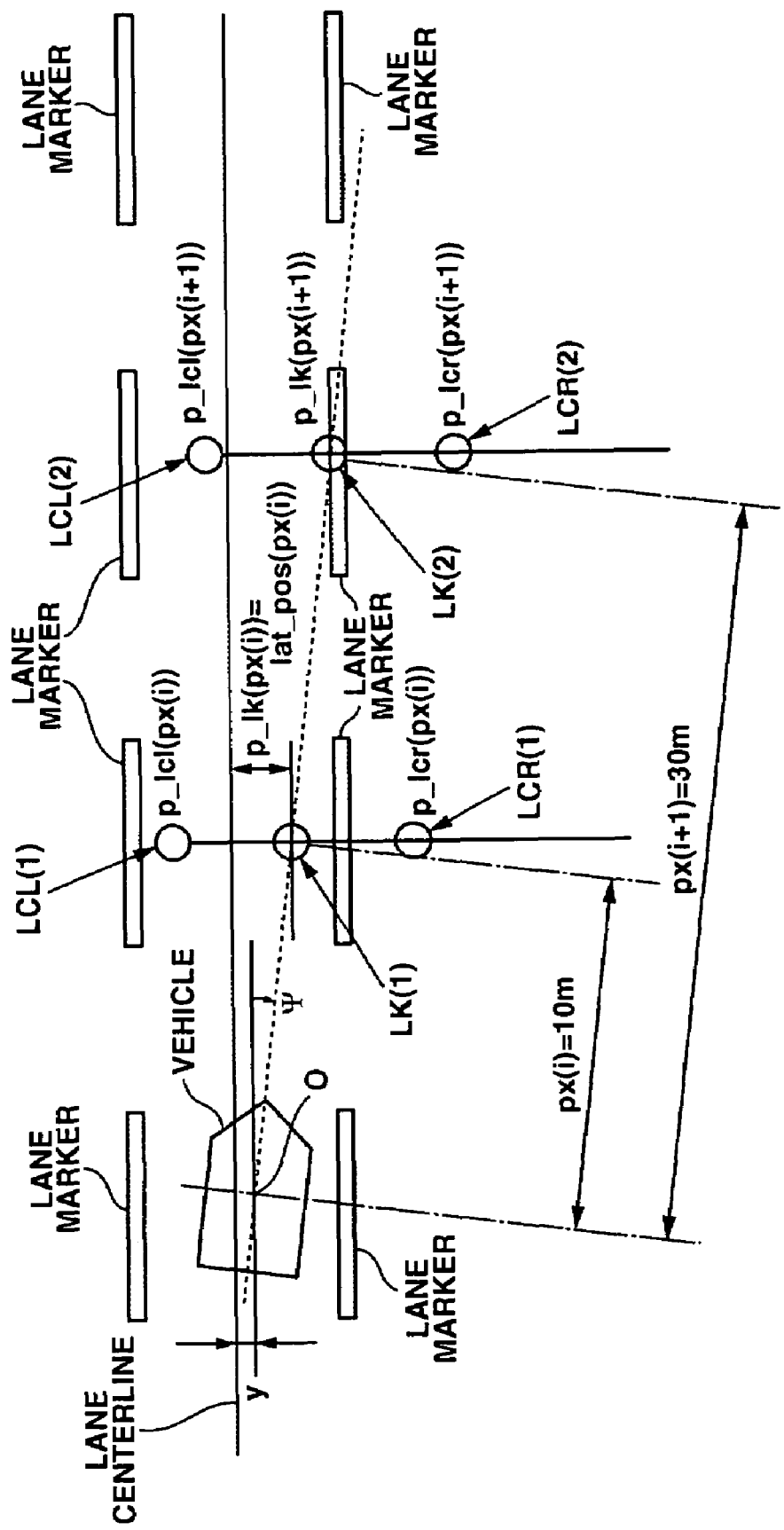
FIG. 3 illustrates calculation of an operation amount for an imaginary driver.

Referring to FIGS. 2 and 3, the operation of the driver's intention estimating system 1 is explained. The flow chart in FIG. 2 illustrates a driver's intention estimation processing program. Execution of this program is repeated at a regular interval of ΔT, for example, ΔT=50 milliseconds.

At step S101, the microcomputer reads in data related to a lateral position y of the vehicle within a lane (or track) and a yaw angle ψ of the vehicle. As shown in FIG. 3, the lateral position y is a distance of a center O of the vehicle from the centerline of the lane, and the yaw angle ψ is an angle through which the vehicle is turned relative to a specific reference, such as a line parallel to the centerline of the lane.

At step S102, the microcomputer calculates an operation Oid of each of a plurality of imaginary drivers. In this example, the plurality of imaginary drivers are variable in number and includes an imaginary driver A designed to behave as directed by the latest intention of a mother series of a lane-keeping intention (LK). The remaining of the plurality of imaginary drivers consists of at least one imaginary driver B designed to behave as directed by a lane-change intention to the right (LCR), and at least one imaginary driver C designed to behave as directed by a lane-change intention to the left (LCL). The microcomputer calculates an operation amount Oid, by which each of these three imaginary drivers A, B and C would operate an operation device in driving the vehicle as directed by the intention. In the exemplary implementation, the operation device is a steering system of the vehicle. In this case, the operation amount Oid is a steering angle θid. More particularly, the microcomputer calculates a steering angle θid, which each of the three imaginary drivers A, B and C would perform to manipulate a steering wheel in driving the vehicle as directed by the intention. The following descriptions describe how a steering angle θid associated with an imaginary driver is calculated.

(1) Imaginary Driver A Having A Lane-Keeping Intention (LK):

Steering angle θid.lk represents an angle that imaginary driver A having a lane-keeping intention (LK) would manipulate a steering wheel in driving the vehicle as directed by the lane-keeping intention (LK). The microcomputer sets at least one reference point LK(i) in front on a longitudinal centerline of the vehicle at a distance px(i) from the center O of the vehicle, and calculates a lateral position p.lk(px(i)) of the reference point LK(i) from a centerline of a lane. At least one reference point LK(i) includes any desired number of reference points LK(i). In this example, as shown in FIG. 3, two reference points LK(1) and LK(2) are set on the longitudinal centerline of the vehicle at different distances px(1) and px(2)

from the center O of the vehicle, wherein the distance px(1) =10 m and the distance px(2)=30 m. The distance px(i) may have varying values with different vehicle speeds.

A lateral distance lat.pos(px(i)) of the reference point LK(i) from the centerline of the lane is dependent on, and is determined by, the yaw angle ψ and the distance px(i), which may be determined, for example, by processing the acquired image from the front camera. Thus, the lateral position p.lk (px(i)) of the reference point LK(i) may be expressed as:

$$p.lk(px(i))=\text{lat.pos}(px(i))\ i=\{1,\ldots,n\} \quad (\text{Eq. 1})$$

The number n is equal to 2 (n=2) in the example shown in FIG. 3.

Using the lateral position p.lk(px(i)), the steering angle θid.lk may be expressed as:

$$\theta id.lk=\Sigma\{a(i)\cdot p.lk(px(i))\} \quad (\text{Eq. 2})$$

where: a(i) is an appropriately determined coefficient weighting the lateral position p.lk(px(i)), and is determined based on characteristics of vehicles, such as the gear ratio of a vehicle implementing the system disclosed herein.

(2) Imaginary Driver B Having a Lane-Change Intention to the Right (LCR):

Steering angle θid.lcr represents an angle that imaginary driver B having a lane-change intention to the right (LCR) would manipulate a steering wheel in driving the vehicle as directed by the lane-change intention to the right (LCR). The microcomputer sets at least one reference point LCR(i), which may include any desired number of reference points LCR(i). In this example, as shown in FIG. 3, two reference points LCR(1) and LCR(2) are set.

A lateral position p.lcr(px(i)) of the reference point LCR(i) may be given as a sum of lat.pos(px(i)) and a predetermined offset lc.offset.lcr. Lateral position p.lcr(px(i)) can be expressed as:

$$p.lcr(px(i))=\text{lat.pos}(px(i))+lc.\text{offset}.lcr\ i=\{1,\ldots,n\} \quad (\text{Eq. 3})$$

The number n is equal to 2 (n=2) in the example shown in FIG. 3. The predetermined offset lc.offset.lcr is an appropriately determined value for giving the lateral position p.lcr(px(i)) of the reference point LCR(i). In this example, the offset lc.offset.lcr is equal to −1.75 (lc.offset.lcr=−1.75).

Using the lateral position p.lcr(px(i)), the steering angle θid.lcr may be expressed as:

$$\theta id.lcr=\Sigma\{a(i)\cdot p.lcr(px(i))\} \quad (\text{Eq. 4})$$

where: a(i) is an appropriately determined coefficient weighting the lateral position p.lcr(px(i)), and is determined based on characteristics of vehicles, such as the gear ratio of a vehicle implementing the system disclosed herein.

(3) Imaginary Driver C Having Lane-Change Intention to the Left (LCL):

Steering angle θid.lcl represents an angle by which an imaginary driver C having a lane-change intention to the left (LCR) would manipulate a steering wheel in driving the vehicle as directed by the lane-change intention to the left (LCR). The microcomputer sets at least one reference point LCL(i), which may include any desired number of reference points LCL(i). In this example, as shown in FIG. 3, two reference points LCL(1) and LCL(2) are set.

A lateral position p.lcl(px(i)) of the reference point LCL(i) may be given by a sum of lat.pos(px(i)) and a predetermined offset lc.offset.lcl, and thus expressed as:

$$p.lcl(px(i))=\text{lat.pos}(px(i))+lc.\text{offset}.lcl\ i=\{1,\ldots,n\} \quad (\text{Eq. 5})$$

The number n is equal to 2 (n=2) in the example shown in FIG. 3. The predetermined offset lc.offset.lcl is an appropriately determined value for giving the lateral position p.lcl(px(i)) of the reference point LCL(i). In this example, the offset lc.offset.lcl is equal to 1.75 (lc.offset.lcr=1.75).

Using the lateral position p.lcl(px(i)), the steering angle θid.lcl may be expressed as:

$$\theta id.lcl=\Sigma\{a(i)\cdot p.lcl(px(i))\} \quad (\text{Eq. 6})$$

where: a(i) is an appropriately determined coefficient weighting the lateral position p.lcl(px(i)), and is determined based on characteristics of vehicles, such as the gear ratio of a vehicle implementing the system disclosed herein.

After calculating the operation amount Oid of each of the imaginary drivers A, B and C at step S102, the logic goes to step S103. At step S103, the microcomputer receives, as an input, an operation amount Ord of a real driver by, in this exemplary implementation, reading in a steering angle θrd detected by the real driver's operation detector 30.

At the next step S104, the microcomputer forms a series of intentions for each of the plurality of imaginary drivers. The types of intentions and the number of the imaginary drivers may change over time. The microcomputer has memory portions for storing the intentions of the imaginary drivers. Each of the memory portions is designed to store m, in number, intentions over a period of time ranging from time (t) back to time (t−m+1). Except for a special memory portion, the microcomputer resets any one of the remaining memory portions upon determination that the memory portion has contained m, in number, intentions of the same kind.

Figure 4:
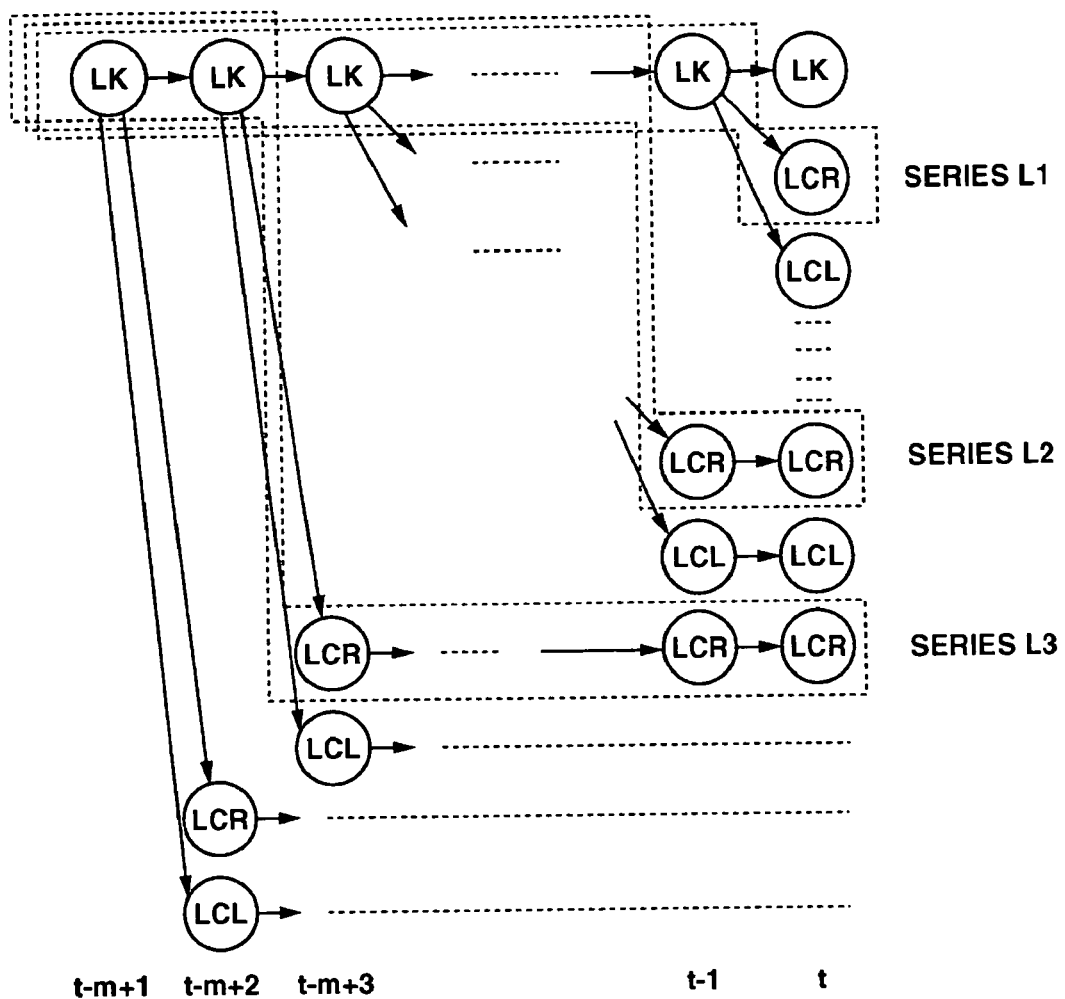
FIG. 4 is an exemplary illustration of generating a series of lane-keeping intentions retained by a parent imaginary driver and derivative lane-change intentions retained by additional imaginary drivers.

FIG. 4 illustrates data related to a plurality of imaginary drivers generated by the microcomputer. Each imaginary driver retains a series of intentions over, m, in number, points in time from time (t) back to time (t−m+1). Referring to FIG. 4, the microcomputer continuously generates a lane-keeping intention (LK) at every point in time. The lane-keeping intentions form a series of intentions assigned to a parent imaginary driver.

Furthermore, the microcomputer generates data related to at least one additional imaginary driver based on the intention of the parent imaginary driver. In the example shown in FIG. 5(a), the microcomputer generates data related to two additional imaginary drivers, each has one of two derivative lane-change intentions (LCR) and (LCL) based on a lane-keeping intention (LK) of the parent imaginary driver at an immediately preceding point in time. In addition, the two additional imaginary drivers generated at a specific point of time assumes at least some of the intentions for all points in time preceding the specific point in time, from the parent imaginary driver.

Figure 5A:
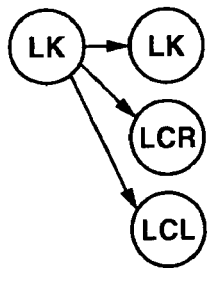
FIG. 5(a) shows a rule for applying to the generation of data related to imaginary drivers as illustrated in FIG. 4.
Figure 5B:
FIG. 5(b) shows another rule for applying to the generation of data related to imaginary drivers as illustrated in FIG. 4.

Referring also to FIG. 5(a), the microcomputer applies certain rules in generating series of intentions for existing additional imaginary drivers. For instance, the microcomputer determines whether an imaginary driver retaining one of the derivative lane-change intentions may continue to exist at the next point in time, by applying one or more rules. An exemplary rule allows the parent imaginary driver to retain a lane-keeping intention (LK) at every point in time, and generates data related to two additional imaginary drivers having lane-change intentions (LCR) and (LCL), respectively, at the next point in time. According to another exemplary rule, an imaginary driver is allowed to retain a lane-change intention to the right (LCR) at the next point in time if it is determined that the real driver continues to retain a lane-changing intention at the present point in time. On the other hand, if it is determined that at a specific point in time, the real driver no longer wants to change lanes or has just changed lanes, an imaginary driver is not allowed to retain a lane-change intention to the right (LCR) at the next point in time. This is equally applicable to a lane-change intention to the left (LCL). Accordingly, an imaginary driver having a lane-change intention to the left (LCL) at a specific point in time is allowed to retain a lane-change intention to the left (LCL) at the next point in time upon determination that a lane change continues, but the imaginary driver is not allowed to continue to retain a lane-change intention to the left (LCL) at a specific point in time upon failure to determine that the lane change continues. Therefore, an imaginary driver that has one of the derivative lane-change intentions (LCR) and (LCL), is allowed to retain the derivative lane-change intention at the next point in time upon determination that a lane change continues.

As described above, a special memory portion is provided for storing intentions of the parent imaginary driver. The intentions include m, in number, lane-keeping intentions (LK), over a period of time ranging from time (t) back to time (t−m+1). Each of the remaining memory portions is provided for storing intentions for one of the additional imaginary drivers. The intentions include lane-change intention (LCR) or (LCL) over a period of time ranging from time (t) back to time (t−m+1). It is now apparent that, except for the special memory portion provided to the parent imaginary driver, the microcomputer resets memory portions for the additional imaginary drivers upon determination that the memory portion has contained m, in number, lane-change intentions.

Referring to FIG. 4, "SERIES L1" corresponds to a series of intentions of an additional imaginary driver that is generated at time t, and includes a lane-change intention to the right (LCR) at time (t). "SERIES L2" includes two lane-change intentions to the right (LCR) and represents intentions of another additional imaginary driver generated earlier. "SERIES L3" includes (m−3), in number, lane-change intentions to the right (LCR) and represents intentions of still another imaginary driver that is generated earlier than "SERIES L1" and "SERIES L2."

The imaginary driver corresponding to "SERIES L1" retains a lane-keeping intention (LK) at ever point in time from time (t−m+1) to time (t−1), and has a lane-change intention to the right (LCR) at the time (t). The imaginary driver corresponding to "SERIES L2" retains a lane-keeping intention (LK) at every point in time from time (t−m+1) to time (t−2), and shifts to a lane-change intention to the right (LCR) at time (t−1). The imaginary driver corresponding to "SERIES L3" retains a lane-keeping intention (LK) at every point in time from time (t−m+1) to time (t−m+2), and shifts to a lane-change intention to the right (LCR) at time (t−m+3).

FIGS. 5($a$) and 5($b$) show rules that the imaginary driver's intention generating section 40 (see FIG. 1) applies in determining an intention for each existing imaginary driver at each point in time. As mentioned before, the microcomputer allows a parent imaginary driver having a lane-keeping intention (LK) at every point in time. As shown in FIG. 5($a$), the microcomputer generates data related to two additional imaginary drivers, each has one of two derivative lane-change intentions (LCR) and (LCL) based on a lane-keeping intention (LK) of the parent imaginary driver at an immediately preceding point in time.

At each point in time, the microcomputer determines whether or not the vehicle's environment allows lane-change intentions are allowed to continue to exist at the next point in time by applying certain rules. FIG. 5($b$) shows an exemplary rule used by the microcomputer. As shown in FIG. 5($b$), an imaginary driver is allowed to retain a lane-change intention to the right (LCR) at the next point in time, if it is determined that the real driver continues to retain a lane-changing intention at the present point in time. On the other hand, if it is determined that at a specific point in time, the real driver no longer wants to change lanes or has just changed lanes, an imaginary driver is not allowed to retain a lane-change intention to the right (LCR) at the next point in time. This is equally applicable to a lane-change intention to the left (LCL). Accordingly, an imaginary driver having a lane-change intention to the left (LCL) at a specific point in time is allowed to retain a lane-change intention to the left (LCL) at the next point in time upon determination that a lane change continues, but the imaginary driver is not allowed to continue to retain a lane-change intention to the left (LCL) at a specific point in time upon failure to determine that the lane change continues. Therefore, an imaginary driver that has one of the derivative lane-change intentions (LCR) and (LCL), is allowed to retain the derivative lane-change intention at the next point in time upon determination that a lane change continues.

In the exemplary implementation, on one hand, the microcomputer determines that the lane-change intention may continue to exist if the vehicle continues to stay in the same lane. On the other hand, the microcomputer determines that the lane-change intention has been realized if the vehicle has changed to a different lane. In other words, the microcomputer fails to determine that the lane-change intention continues. Thus, lane-change intentions (LCR) and (LCL) at a specific point in time are allowed to continue to exist at the next point in time upon determination that the vehicle continues to stay in the same lane. In contrast, lane-change intentions (LCR) and (LCL) are not allowed to continue to exist at the next point in time upon determination that the vehicle has changed to a different lane. As will be understood from the descriptions below, all imaginary drivers (except for the parent imaginary driver) that have at least one derivative lane-change intention (LCR) or (LCL) are terminated and reset upon determination that the vehicle has changed to a different lane.

At step S105, using the calculated operation amount Oid of each imaginary driver (calculated at step S102) and the detected operation amount Ord of the real driver (detected at step S103), the microcomputer calculates a likelihood value Pid indicating how the calculated operation amount Oid of each imaginary driver approximates the detected operation amount Ord of the real driver. For illustration purpose, the likelihood value Pid is used to represent a likelihood value Pid.lk of an imaginary driver having a lane-keeping intention (LK), a likelihood value Pid.lcr of an imaginary driver having a lane-change to the right (LCR), or a likelihood value Pid.lcl of an imaginary driver having a lane-change intention to the left (LCL). In the exemplary implementation, the calculated operation amount Oid of each imaginary driver is expressed by any one of the calculated steering angles $\theta$id.lk, $\theta$id.lcr, and $\theta$id.lcl. For illustration purpose, an imaginary driver's steering angle $\theta$id is used to represent any one of these calculated steering angles $\theta$id.lk, $\theta$id.lcr, and $\theta$id.lcl. In the exemplary implementation, the detected operation amount Ord of the real driver is expressed by the detected steering angle $\theta$rd performed by the real driver.

Many mathematical calculations can be used to compute the likelihood value Pid. For example, the likelihood value Pid of each imaginary driver is a logarithmic probability of a normalized value of the imaginary driver's steering angle $\theta$id relative to a normal distribution, where the mean (e) is the real driver's steering angle $\theta$rd and the variance ($\sigma$) is a predetermined value $\rho$rd such as a standard deviation of steering angles. Generally, the value of $\rho$rd depends on characteristics of the vehicle, such as the steering gear ratio, and/or the speed of the vehicle. ρrd may range from −15 degrees to +15 degrees, such as between 3 to 5 degrees. Of course, other values of ρrd may be used depending on the type and/or characteristics of vehicles. The likelihood value Pid is expressed as:

$$Pid = \log\{Probn[(\theta id - \theta rd)/\rho rd]\} \tag{Eq. 7}$$

where Probn is a probability density function that is used to calculate a probability with which a given sample is observed from a population expressed by the normal distribution.

At step S105, using before-mentioned equation Eq. 7, the microcomputer calculates a likelihood value Pid(t) for each of the imaginary drivers of a dynamic family illustrated in FIG. 4. The calculated likelihood values are stored in the memory portions corresponding to each imaginary driver j, and are expressed as Pid(j)(t), where j corresponds to one of the imaginary drivers. Thus, Pid(j)(t) means a calculated likelihood value for an imaginary driver j having an intention at time (t).

At step S106, using the stored likelihood values Pid(j)(t) ~Pid(j)(t−m+1), the microcomputer calculates a collective likelihood value P(j)ids for each imaginary driver j that is designed to behave as directed by intentions associated with each imaginary driver j. The collective likelihood value P(j) ids may be expressed as:

$$P(j)ids = \prod_{i=1}^{m} Pid(j)(t-i+1) \tag{Eq. 8}$$

Equation Eq. 8 states that the collective likelihood value P(j)ids is the product of all of the calculated likelihood values Pid(j)(t)~Pid(j)(t−m+1).

At step S107, the microcomputer estimates a real driver's intention λrd. In this exemplary implementation, the microcomputer chooses one of the imaginary drivers that has the maximum calculated collective likelihood values P(j)ids among all imaginary drivers. The series of intentions corresponding to the chosen imaginary driver is now labeled Lmax. Then, the microcomputer chooses the latest intention of the series Lmax to approximate a real driver's intention λrd. The real driver's intention λrd may be expressed as:

$$\lambda rd = \max[Pid(Lmax).lk(t), Pid(Lmax).lcr(t), Pid(Lmax).lcl(t)] \tag{Eq. 9}$$

At step S108, the microcomputer calculates a confidence index Sc of the intention λrd estimated at step S107. Referring to FIG. 4, that the parent imaginary driver has a lane-keeping intention (LK) at time (t). There is a plurality of additional imaginary drivers having derivative intentions. The additional imaginary drivers may be divided into a LCR group and a LCL group. The LCR group consists of additional imaginary drivers that has a lane-change intention to the right (LCR) at time (t). The LCL group consists additional imaginary drivers that has a lane-change intention to the left (LCL) at time (t).

If the estimated real driver's intention λrd determined at step S107 is indicative of a lane-change intention to the right (LCR), the chosen series Lmax belongs to the LCR group. The collective likelihood value P(Lmax)ids is known and the maximum among the additional imaginary drivers in the LCR group is selected. This known collective likelihood value P(Lmax) corresponds to an imaginary driver having a lane-change intention with the highest probability Pr(LC). In addition to the selection of the series Lmax, the parent imaginary driver is selected and its collective likelihood value P(j=parent)ids is stored as an imaginary driver having a lane-keeping intention with the highest probability Pr(LK).

If the estimated real driver's intention λrd determined at step S107 is indicative of a lane-change intention to the left (LCL), the chosen series Lmax belongs to the LCL group. The collective likelihood value P(Lmax)ids is known and the maximum among to the additional imaginary drivers in the LCL group is selected. This known collective likelihood value P(Lmax)ids is stored as the imaginary driver having a lane-change intention with the highest probability Pr(LC). In addition to the selection of the series Lmax, the parent imaginary driver is selected and its collective likelihood value P(j=parent)ids is stored as the imaginary driver having a lane-keeping intention with the highest probability Pr(LK).

If the estimated real driver's intention λrd determined at step S107 is indicative of a lane-keeping intention to the left (LK), the chosen series Lmax correspond to the parent imaginary driver. The collective likelihood value P(Lmax)ids for the parent imaginary driver is known and stored as the imaginary driver having a lane-keeping intention with the highest probability Pr(LK). In addition to the selection of the series Lmax, among the additional imaginary drivers in the LCR group or LCL group, an additional imaginary driver that has the maximum collective likelihood values P(j)ids among all the additional imaginary drivers is selected, and its collective likelihood value valve P(j)ids is stored as the imaginary driver having the lane-change intention with the highest probability Pr(LC).

Figure 6:
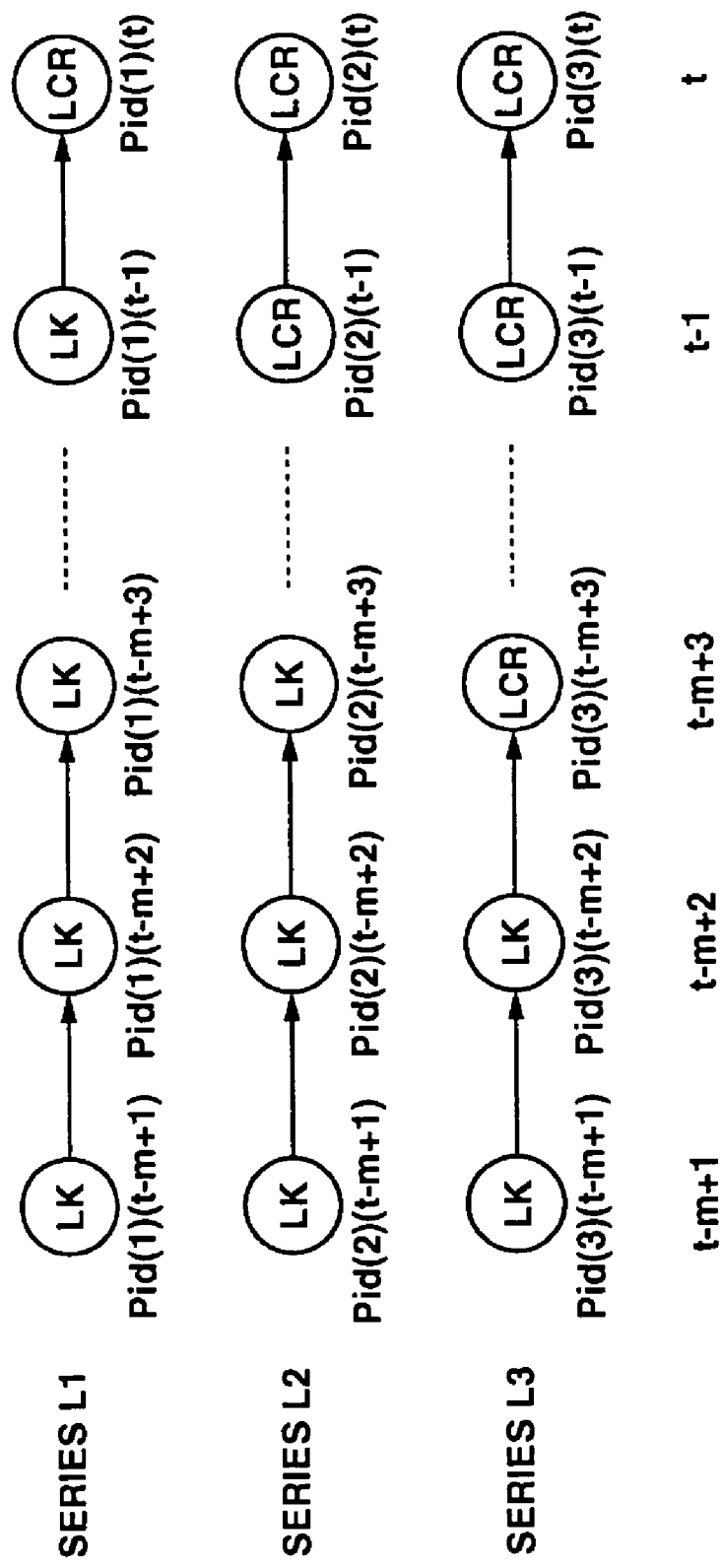
FIG. 6 is an exemplary illustration of three series of intentions and respective likelihood values associated with additional imaginary drivers, each series has a lane-change intention to the right (LCR) as the most recent intention.

Referring to FIG. 6, if the estimated real driver's intention λrd is indicative of a lane change to the right (LCR), and an additional imaginary driver corresponding to "SERIES L3" has the maximum collective likelihood values, "SERIES L3" is labeled Lmax and the collective likelihood value P(3)ids is stored as Pr(LC). The collective likelihood value for the parent imaginary driver is stored as Pr(LK).

For illustration purpose only, the lane-change intention to the right (LCR) and the lane-change intention to the left (LCL) are collectively represented as lane-change (LC). Using the values stored as Pr(LC) and Pr(LK), the confidence index Sc may be expressed as:

$$Sc = 1/\{1 + \exp(-2 \times k \times Pr(LC)/Pr(LK))\} \tag{Eq. 10}$$

where: k is an appropriate coefficient, which is usually set approximately to 1 (such as 0.8, 0.9 or 1.0).

The confidence index Sc expressed by the equation Eq. 10 has a range between 0 to 1. The confidence index Sc increases as the probability stored as Pr(LC) increases relative to the probability stored as Pr(LK). When the probability for LC and that for LK are 50:50, the confidence index Sc is 0.5 (Sc=0.5). When the probability for LC is 1, the confidence index Sc is 1 (Sc=1).

At step S109, the microcomputer generates an output including the estimated real driver's intention λrd and confidence index Sc.

Figure 7:
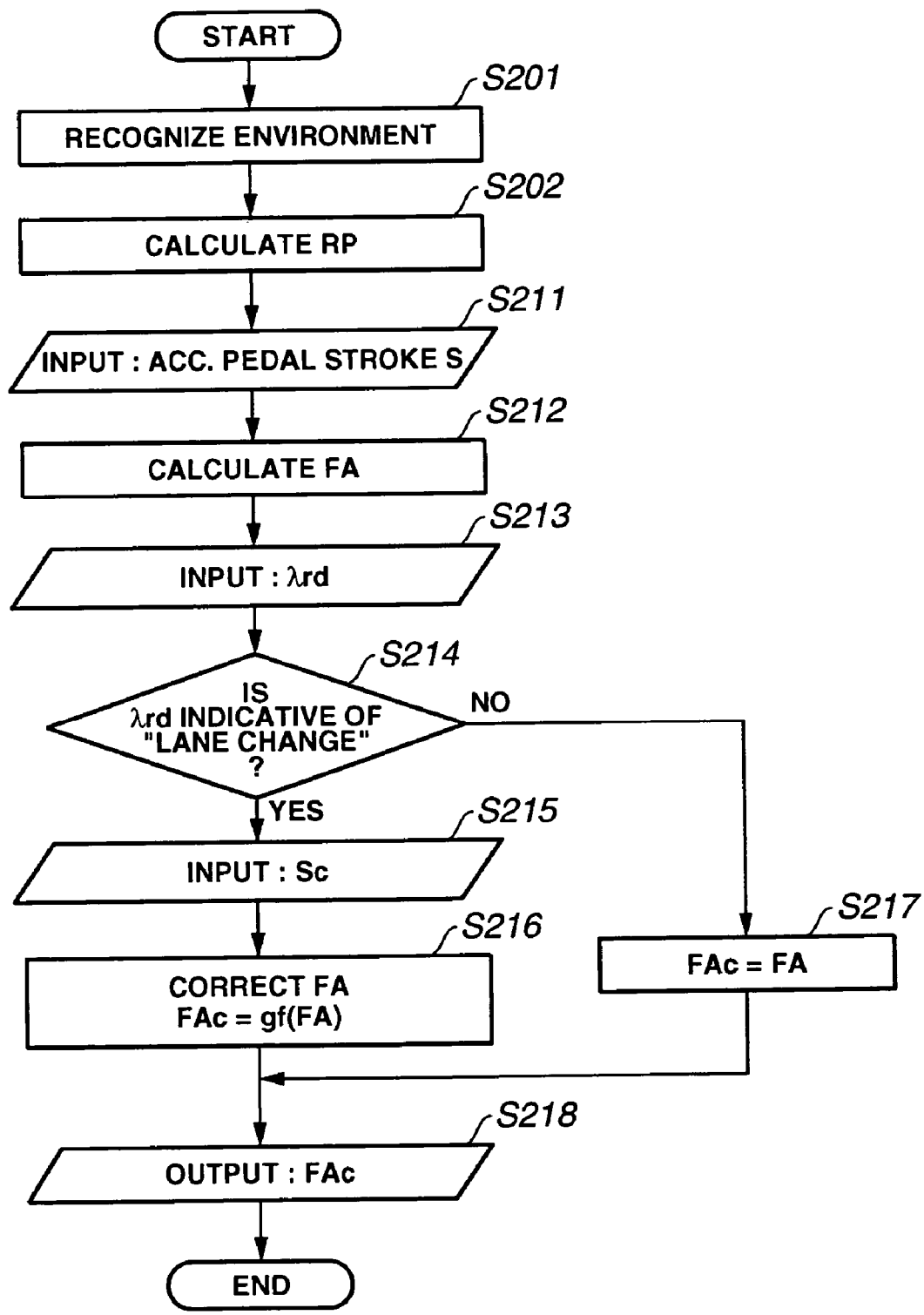
FIG. 7 is a flow chart illustrating operation of the driver assisting system illustrated in FIG. 1(b).

The flow chart in FIG. 7 illustrates a control routine of a driver assisting control program stored in the controller 150. The execution of the control routine is repeated at regular interval of, for example, 50 msec.

In FIG. 7, at step S201, the controller 150 recognize environment in a field around the host vehicle. In particular, the controller 150 receives, as inputs, signals of the laser radar 110, front camera 120 and vehicle speed sensor 140 by reading operations to acquire data regarding the vehicle's status and the vehicle's environment. For example, imaging a traffic scene where the host vehicle is following the preceding vehicle, the acquired data include a vehicle speed V1 of the host vehicle, a vehicle speed V2 of the preceding vehicle, and a relative speed to the preceding vehicle Vr. The relative speed Vr may be expressed as Vr=V2−V1. The acquired data may include a coordinate X1 of the host vehicle and a coordinate X2 of the preceding vehicle, and a distance D to the preceding vehicle. The distance D may be expressed as D=X2−X1.

At step S202, the controller 150 calculates a risk potential RP associated with the vehicle based on time to collision TTC and time headway THW, which are used as two exemplary notions to calculate the risk potential RP.

The TTC is an estimated period of time before the distance D becomes zero if the relative speed Vr to the preceding vehicle remains unchanged. The TTC may be expressed as:

$$TTC = -D/Vr \tag{Eq. 11}$$

The smaller the value of TTC, the more imminent is a collision is likely to occur. In the traffic scene where the host vehicle is following the preceding vehicle, most vehicle drivers perceived a high degree of risk and initiated deceleration to avoid collision well before the TTC becomes less than 4 seconds. To some extent, the TTC is a good indication for predicting future behaviors of the vehicle driver. However, when it comes to quantifying the degree of risk, which the vehicle driver actually perceives, TTC alone is insufficient to quantify the degree of risk.

For instance, in a scenario in which the relative speed Vr is zero. In this case, the TTC is infinite irrespective of how narrow the distance D is. However, in reality, the driver perceives an increase in the degree of risk in response to a reduction in the distance D, accounting for an increase in influence on the TTC by an unpredictable drop in a vehicle speed of the preceding vehicle.

To address the above-mentioned discrepancy, the notion of time headway THW has been introduced to quantify an increase of an influence on TTC by an unpredictable drop in the vehicle speed of the preceding vehicle. THW is a period of time between the preceding vehicle reaching a specific location and when the following vehicle reaching the same location, at which point in time, THW is reset. The THW is expressed as, $$THW = D/V1 \tag{Eq. 12}$$

In the case where the host vehicle is following the preceding vehicle, the vehicle speed V2 of the preceding vehicle may be used instead of the vehicle speed V1 in Eq. 12.

The relationship between the two notions TTC and THW is such that a change in vehicle speed V2, if any, of the preceding vehicle will result in a small change in the value of TTC when the THW is large, but the same change in vehicle speed V2 of the preceding vehicle will result in a large change in the value of TTC when the THW is small.

In this exemplary implementation, the risk potential RP calculated at step S202 is expressed as a sum of a first index and a second index. The first index represents a degree that the vehicle has approached the preceding vehicle. The second index represents a degree that an unpredictable change in vehicle speed V2 of the preceding vehicle might have influence upon the vehicle. The first index may be expressed as a function of the reciprocal of time to collision TTC, and the second index may be expressed as a function of the reciprocal of time headway THW. The risk potential RP may be expressed as:

$$RP = a/THW + b/TTC \tag{Eq. 13}$$

where: b and a (b>a) are parameters weighting 1/TTC and 1/THW, respectively, such that 1/THW is less weighted than 1/TTC. The values of a and b are optimized after accounting for a statistics of values of THW and TTC collected in a traffic scene including the host vehicle is following the preceding vehicle. In this exemplary implementation, b=8 and a=1.

At step S211, the controller 150 receives, as an input, an accelerator pedal stroke S by reading operation of the output of the accelerator pedal stroke sensor 181.

At step S212, the controller 150 calculates an accelerator pedal reaction force instruction value FA. First, the controller 150 calculates a reaction force increment ΔF in response to the risk potential RP by, for example, referring to the characteristic curve shown in FIG. 8.

Figure 8:
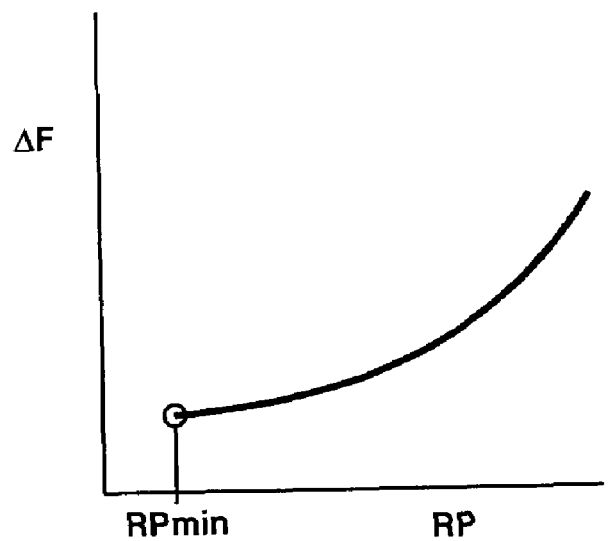
FIG. 8 illustrates characteristics of a reaction force increment ΔF relative to different values of risk potential (RP).

The curve in FIG. 8 shows characteristics of reaction force increment ΔF relative to different values of risk potential RP by the driver from the preceding vehicle. When the risk potential RP is smaller than a minimum value RPmin, the reaction force increment ΔF is always zero to prevent forwarding unnecessary information to the driver. An appropriate value of RPmin can be determined and set empirically.

When the risk potential RP exceeds the minimum value RPmin, the reaction force increment ΔF increases exponentially as the risk potential RP increases. The reaction force increment ΔF within this region may be expressed as:

$$\Delta F = k \cdot RP^n \tag{Eq. 14}$$

where: k and n are constants that are appropriately determined based on results obtained by drive simulator and field drive to provide smooth conversion of the risk potential RP to the reaction force increment ΔF.

The controller 150 calculates the sum of the reaction force increment ΔF and the ordinary reaction force characteristic to give the accelerator pedal reaction force instruction value FA.

At step S213, the controller 150 reads, as an input, the estimated real driver's intention λrd determined by the real driver's intention estimating system 1.

At step S214, the controller 150 determines whether or not the estimated driver's intention λrd is indicative of a lane-change intention. If this is the case, the logic goes to step S215.

At step S215, the controller 150 reads the confidence index Sc for a lane-change intention, which is determined as the real driver's intention estimating system 1.

At step S216, the controller 150 corrects the accelerator pedal reaction force instruction value FA to provide a corrected accelerator pedal reaction force instruction value FAc. In this exemplary implementation, the accelerator pedal reaction force instruction value FA is processed by a low-pass filter and decreased. In this case, the corrected accelerator pedal reaction force instruction value FAc may be expressed as:

$$FAc = gf_F(FA) = kf\{1/(1+Tsf)\} \cdot FA \tag{Eq. 15}$$

where: kf is an appropriately determined constant, and Tsf is a time constant of the low-pass filter, which is determined as a function of the confidence index Sc and may be expressed as:

$$Tsf = f_j(Sc) \tag{Eq. 16}$$

Figure 9:
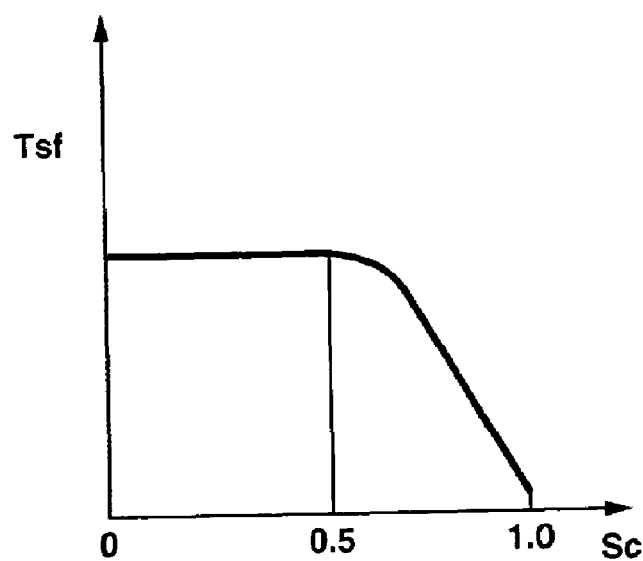
FIG. 9 illustrates characteristics of a time constant Tsf relative to different values of a confidence index Sc.

FIG. 9 illustrates characteristics of function $f_j(Sc)$. As illustrated in FIG. 9, the time constant Tsf decreases as the confidence index Sc increases, which allows a faster reduction in the accelerator pedal reaction force.

If, at step S214, the controller 150 determines that the estimated driver's intention λrd is indicative of a lane-keeping intention (LK), the logic goes to S209.

At step S217, the controller 150 sets the accelerator pedal reaction force instruction value FA as the corrected accelerator pedal reaction force instruction value FAc.

At step S218, the controller 150 provides, as an output, the corrected accelerator pedal reaction force instruction value FAc that has been determined at step S216 or S217 to the accelerator pedal reaction force control unit 170.

The accelerator pedal reaction force control unit 170 controls the servo motor 180 in response to the corrected accelerator pedal reaction force instruction value FAc.

The exemplary implementation provides effects as follows:

(1) The driver's intention estimating system 1 estimates a real driver's intention λrd based on a status of a host vehicle operated by the real driver and a state of environment around the vehicle, and calculates a confidence index Sc of an estimated intention λrd of the real driver. With confidence index Sc, it is possible to evaluate how determined the real driver is in performing an operation based on the estimated intention λrd. The driver assisting system 100 modifies an accelerator pedal reaction force based on the estimated results at the driver's intention estimating system 1 during regulation of the accelerator pedal reaction force based on a risk potential RP associated with the vehicle. This approach allows regulation of the accelerator pedal reaction force to meet the driver's intention and to provide a feedback to the driver indicating a risk potential RP by applying a reaction force to the driver.

(2) The driver's intention estimating system 1 is configured to dynamically create data related to a plurality of imaginary drivers. For each of imaginary driver j, a collective likelihood value P(j)ids is calculated. The driver's intention estimating system 1 estimates a real driver's intention λrd by comparing the collective likelihood values P(i)ids among all the imaginary drivers. Therefore, an estimate of the real driver's intention can be obtained with better accuracy.

In the exemplary implementation, the confidence index Sc is calculated for every estimated real driver's intention λrd. One may calculate the confidence index only when the estimated real driver's intention indicates a lane-change intention.

In the descriptions above, steering angles θrd and θid are used as operations Ord and Oid of the real and imaginary drivers. The present disclosure is not limited to this specific embodiment, as many other operations can also be applied. For example, an accelerator pedal stroke instead of a steering angle can be used. In this case, an accelerator pedal stroke Sid of an imaginary driver may be calculated based on a degree to which the vehicle has approached the preceding vehicle. This degree may be expressed by distance to the preceding vehicle and time headway THW. A likelihood value of the accelerator pedal stroke Sid with respect to an accelerator pedal stroke Srd of a real driver is calculated for use in estimating a real driver's intention.

In the preceding description, two reference points are provided for one of the intentions as shown in FIG. 3. In application, any desired number of reference points may be provided.

Furthermore, in the previous descriptions, series of intentions corresponding to imaginary drivers are dynamically created for calculation of operation amounts Oid. An estimated intention λrd is then determined by comparing the calculated operation amounts of the imaginary drivers relative to the operation amount of a real driver. However, the estimated intention of the real driver can be obtained using many different approaches. For instance, it is possible to estimate a real driver's intention by comparing predetermined reference operation patterns wit the actual operation pattern of a real driver.

In order to determine reference operation patterns, certain mathematical or statistical tools may be used. For example, the support vector machine (SVM) and relevance vector machine (RVM) are techniques for pattern recognition for detecting a real driver's intention. The SVM is a good technique for classification of non-parametric patterns. The SVM is a technique to find a separating plane by maximizing the margin between the separating plane and input patterns to be separated, and is expressed by an equation as a linear separator according to kernel characteristics. Using this equation, the separating plane by the SVM can be obtained as a solution to the second order optimization problem. The RVM proposed by Tipping is a kernel learning system. According to the RVM technique, in estimating a function out of data obtained by learning, a preliminary distribution with its mean being zero is given, and the EM algorithm is used to optimize its variance with respect to likelihood of weighting parameters.

Using the SVM or RVM technique, it is necessary to learn beforehand a correct pattern for operating a vehicle corresponding to the subjects (a lane-keeping intention and a lane-change intention) to be recognized. Upon actual recognition, it is needed to provide on a real time basis an actual pattern for operating a vehicle by a real driver. It is determined whether the real driver's intention is a lane-keeping intention or a lane-change intention based on the coincidence between the learned pattern and the actual pattern.

A discriminant, which may be used in SVM and RVM, may be expressed as:

$$y(x) = \sum_{n=1}^{N} w_n K(x, x_n) + w_0 \tag{Eq. 17}$$

In the equation Eq. 17, $w_n$ is a predetermined, by learning, recognition parameter for input of a plurality of operation amounts (for example, a steering angle, an accelerator pedal stroke) and a plurality of vehicle status amounts (for example, a vehicle speed, a lateral distance to a centerline of a lane) to K. The result y(x) of the equation Eq. 17 provides a discrimination whether the real driver's intention is a lane-keeping intention or a lane-change intention. The x and xn are unknown values representing actual operations, such as steering operation angles, gas pedal depression angles or vehicle speed. Wm is a predetermined parameter that represents a learned condition.

In using SVM or RVM, the real driver's intention λrd may be estimated as a result of pattern discrimination. Using the degree of coincidence between the patterns makes it possible to calculate a confidence index Sc with regard the estimated real driver's intention λrd. If pattern discrimination technique is used, the confidence index Sc may be used to quantity how determined the real driver is to perform an operation according to the intention λrd.

Second Exemplary Implementation of the Disclosure

Figure 10:
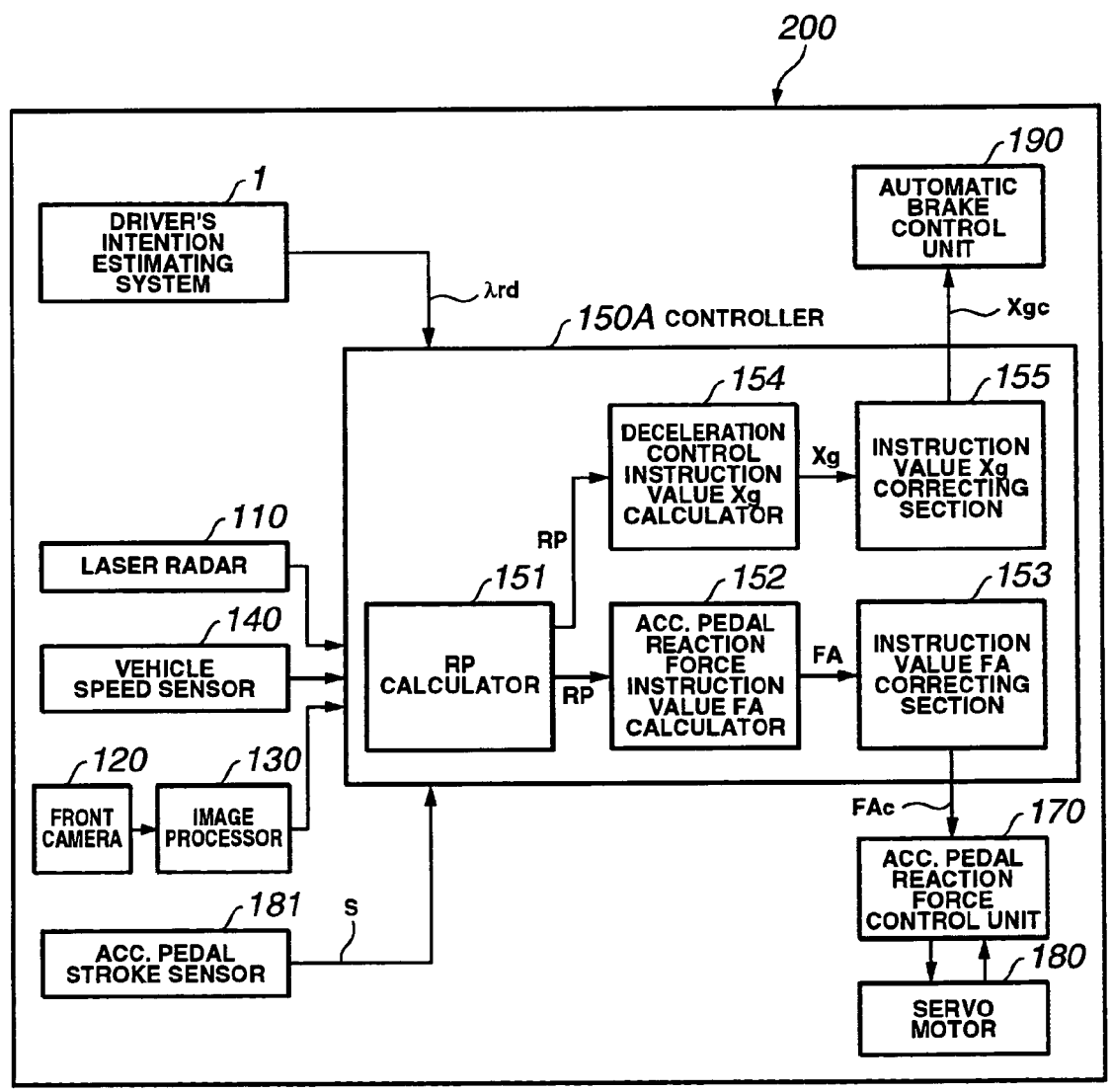
FIG. 10 is a block diagram illustrating another exemplary implementation of a driver assisting system according to the present disclosure.

Referring to FIGS. 10 to 12, another exemplary implementation of a driver assisting system 200 is described. The driver assisting system 200 is substantially the same as the driver assisting system 100 illustrated in FIG. 1(b). Thus, like reference numerals are used to designate like parts or portions throughout FIGS. 1(b) and 10. However, the driver assisting system 200 is different from the driver assisting system 100 in that a controller 150A includes a deceleration control instruction value Xg calculator 154 and an instruction value Xg correcting section 155. In addition, an automatic brake control unit 190 is provided.

A RP calculator 151 provides a risk potential RP to both an accelerator pedal reaction force instruction value FA calculator and deceleration control instruction value Xg calculator 154. The deceleration control instruction value Xg calculator 154 calculates a deceleration control instruction value Xg based on the risk potential RP and provides, as an output, a deceleration control instruction value Xg to the instruction value Xg correcting section 155. The instruction value Xg correcting section 155 corrects the instruction value Xg based on the estimated driver's intention λrd and the confidence index Sc, and provides, as an output, a corrected instruction value Xgc to the automatic brake control unit 190.

In response to the corrected instruction value Xgc from the controller 150A, the automatic brake control unit 190 provides, as an output, a brake pressure instruction value to wheel brake actuators for decelerating the vehicle.

Figure 13:
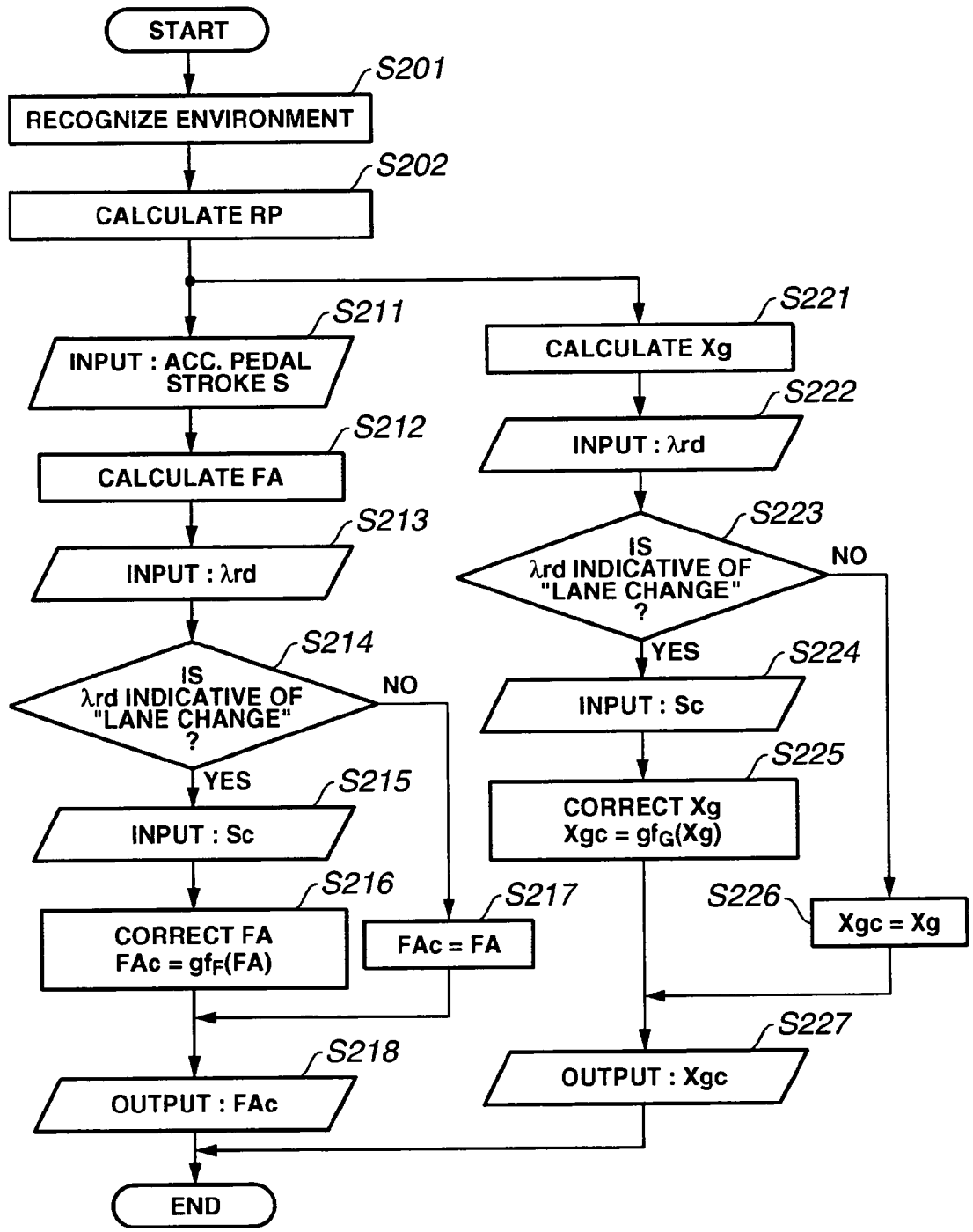
FIG. 13 is a flow chart illustrating operation of the driver assisting system illustrated in FIG. 10.
Figure 14:
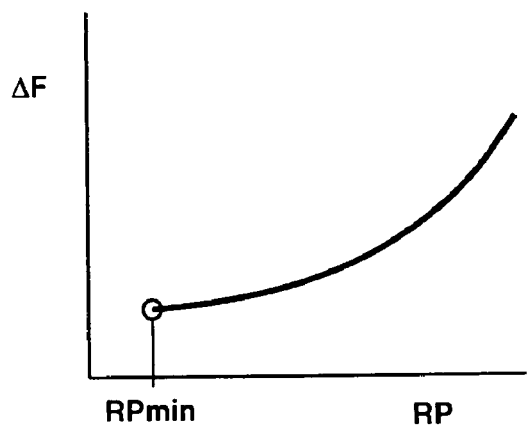
FIG. 14 illustrates characteristics of a reaction force increment ΔF relative to different values of risk potential (RP).

The flow chart in FIG. 13 illustrates a control routine of a driver assisting control program stored in the controller 150A. The execution of the control routine is repeated at regular interval of, for example, 50 msec.

The flow chart in FIG. 13 is substantially the same as the flow chart shown in FIG. 7 except for new steps S221 to S277 performing steps of calculating the deceleration control instruction value Xg, correcting the instruction value Xg, and generating a corrected instruction value Xgc. Like reference numerals are used to designate like steps throughout FIGS. 7 and 13.

Figure 16:
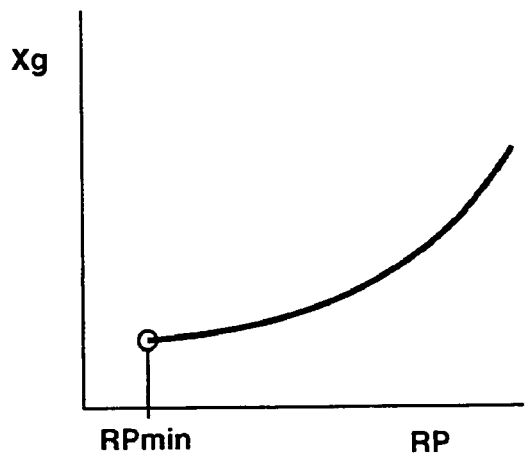
FIG. 16 illustrates characteristics of a deceleration instruction value Xg relative to different values of risk potential (RP).

In FIG. 13, at step S221, the controller 150A calculates the deceleration control instruction value Xg based on the risk potential RP as shown in FIG. 16. FIG. 16 illustrates the relationship between the instruction value Xg and the risk potential RP.

The curve in FIG. 16 shows characteristics of the deceleration instruction value Xg relative to different values of risk potential RP. When the risk potential RP decreases below a minimum value RPmin, the deceleration instruction value Xg is always zero in order to prevent forwarding deceleration shocks to the driver. An appropriate value for RPmin is empirically determined and set.

If risk potential RP exceeds the minimum value RPmin, the deceleration instruction value Xg increases exponentially as the risk potential RP increases.

At step S222, the controller 150A reads, as an input, the estimated real driver's intention λrd determined by the real driver's intention estimating system 1.

At step S223, the controller 150A determines whether or not the estimated real driver's intention λrd is indicative of a lane-change intention. If this is the case, the logic goes to step S224.

At step S224, the controller 150A reads, as an input, the confidence index Sc, for the a lane-change intention, which is determined as the estimated intention of the real driver by the driver's intention estimating system 1.

At step S225, the controller 150A corrects the deceleration instruction value Xg to provide a corrected deceleration instruction value Xgc. In this exemplary implementation, the deceleration instruction value Xg is processed by a low-pass filter and decreased. In this case, the corrected deceleration instruction value Xgc may be expressed as:

$$Xgc = gf_G(Xg) = kg \cdot \{1/(1+Tsg)\} \cdot Xg \quad \text{(Eq. 18)}$$

where: kg is an appropriately determined constant and usually set approximately to 1 (such as 0.8, 0.9 or 1.0), and Tsg is a time constant of the low-pass filter, which is determined as a function of the confidence index Sc and may be expressed as:

$$Tsg = f_g(Sc) \quad \text{(Eq. 19)}$$

Figure 15:
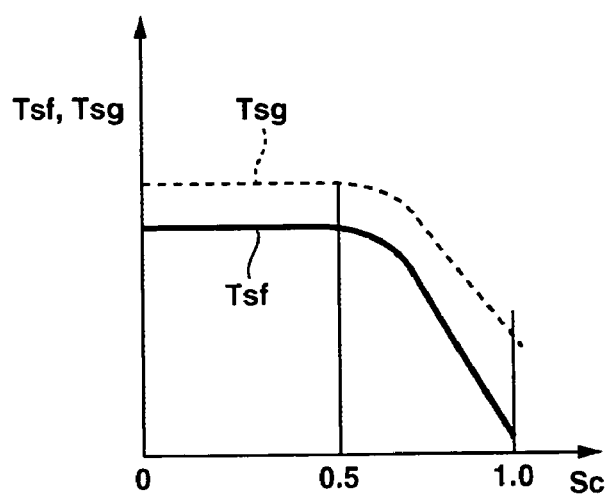
FIG. 15 illustrates characteristics of a time constant Tsf (or Tsg) relative to different values of a confidence index Sc.

The curve shown in dotted line in FIG. 15 illustrates the function $f_g(Sc)$. As shown in FIG. 15, the time constant Tsg decrease as the confidence index Sc increases over 0.5, which allows a fast reduction in the accelerator pedal reaction force.

If, at step S223, the controller 150A determines that the estimated driver's intention λrd is indicative of a lane-keeping intention (LK), the logic goes to S226.

At step S226, the controller 150A sets the deceleration instruction value Xg as the corrected deceleration instruction value Xgc.

At the next step S227, the controller 150A provides, as outputs, the corrected accelerator pedal reaction force instruction value Fac and the corrected deceleration instruction value Xgc to the accelerator pedal reaction force control unit 170 and to the automatic brake control unit 190.

Referring to FIGS. 17(a) to 17(b), the driver assisting system 200 is further described. FIG. 17(a) illustrates a traffic scene in which the host vehicle changes lanes to pass the preceding vehicle. FIGS. 17(b) and 17(b) illustrate changes of the corrected accelerator pedal reaction force instruction value Fac relative to time, and changes of the corrected deceleration instruction value Xgc relative to time during a lane-change operation. The moment at which the estimated real driver's intention λrd indicating a lane-change intention is time ta. In FIGS. 17(b) and 17(c), the curves in solid lines show changes of the instructions values FAc and Xgc when the confidence index Sc is 0.6 (Sc=0.6). The curves in dotted lines show changes of the instruction values FAc and Xgc when the confidence index Sc is 0.8 (Sc=0.8).

As readily seen from FIGS. 17(b) and 17(c), the risk potential RP increases as the host vehicle approaches the preceding vehicle. In response to the increase of the risk potential RP, the corrected accelerator pedal reaction force instruction value FAc and the corrected deceleration instruction value Xgc increase. At time ta, the estimated real driver's intention λrd indicates a lane-change intention. Immediately after the moment ta, the instruction values FAc and Xgc drop gradually. The instruction values FAc and Xgc drop faster as the confidence index Sc becomes larger.

Immediately after the driver has made up his/her mind to change lanes, the accelerator pedal reaction force and the deceleration are regulated to meet expectations of the driver without hampering the driver's action to change lanes. With the same confidence index Sc, the corrected accelerator pedal reaction force instruction value FAc drops faster than the corrected deceleration instruction value Xgc. Thus, a drop in accelerator pedal reaction force notifies the driver that the driver assisting system is ready for his/her lane-change intention. Subsequently, the deceleration control is gradually terminated, to alleviate shocks applied to the driver.

This exemplary implementation provides the following effects:

(1) The controller 150A regulates an accelerator pedal reaction force based on a risk potential RP determined according to environment surrounding a vehicle. The controller 150A modifies the accelerator pedal reaction force based on an estimated driver's intention λrd and a confidence index Sc. Modifying the accelerator pedal reaction force based on estimated driver's intention λrd and confidence index Sc makes it possible to reflect the driver's intention in regulation of accelerator pedal reaction force and continue to provide feedbacks related to the state of environment surrounding the vehicle by applying the reaction force.

(2) The controller 150A allows the accelerator pedal reaction force to decrease as the confidence index Sc becomes higher upon determination that the estimated driver's intention λrd indicates a lane-change intention. Accordingly, the accelerator pedal reaction force drops faster when the confidence index Sc is higher, to meet the driver's demand related to the lane-change intention.

(3) The controller 150A is provided with an accelerator pedal reaction force instruction value FA correcting section 153 that corrects the relationship between the risk potential RP and the reaction force in response to the confidence index upon detection of a lane-change intention of the real driver. Thus, when the confidence index Sc becomes higher, the accelerator pedal reaction force quickly drops, to meet the driver's demand with respect to the lane-change intention.

(4) The controller 150A regulates a vehicle deceleration based on a risk potential RP determined according to environment surrounding a vehicle. The controller 150A modifies the vehicle deceleration based on an estimated driver's intention λrd and a confidence index Sc. Modifying the vehicle deceleration based on estimated driver's intention λrd and confidence index Sc makes it possible to reflect the driver's intention in regulation of vehicle deceleration and continue to provide feedbacks related to the risk from the preceding vehicle.

(5) The controller 150A allows the vehicle deceleration to decrease as the confidence index Sc increases upon determination that the estimated driver's intention λrd is a lane-change intention. Accordingly, the vehicle deceleration drops quickly when the confidence index Sc is high, thus meeting driver's demand related to the lane-change intention.

(6) The controller 150A is provided with a vehicle deceleration control instruction value Xg correcting section that corrects the relationship between the risk potential RP and the vehicle deceleration in response to the confidence index upon determination of a lane-change intention retained by the real driver. Thus, when the confidence index Sc becomes higher, the accelerator pedal reaction force quickly drops, thus meeting the driver's demand in connection with the lane-change intention.

(7) The controller 150A allows the reaction force to drop at a rate greater than that of the vehicle deceleration, relative to the same confidence index Sc upon determination that the estimated driver's intention is a lane-change intention. As shown in FIG. 15, this has been accomplished by setting the time constant Tsf being shorter than the time constant Tsg relative to the same confidence index Sc. Thus, upon determination that the estimated driver's intention λrd is a lane-change intention, the accelerator pedal reaction force drops to notify the driver that the driver assisting system is ready for the driver's intention before the vehicle deceleration drops gradually, thus effectively alleviating unpleasant feeling being felt by the driver.

In the exemplary implementation illustrated in FIG. 10, the accelerator pedal reaction force instruction value FA and the vehicle deceleration instruction value Xg are corrected based on the confidence index Sc, This is only one of many examples that the concepts of this disclosure may be implemented. Another example is to correct a risk potential RP based on the confidence index Sc, and use the corrected risk potential RP to calculate the accelerator pedal reaction force instruction value FA and the vehicle deceleration instruction valve Xg. Instead of modifying the time constants Tsf and Tsg, it is possible to provide time constant terms (k1×Tsf) and (k2×Tsg) by setting predetermined values for Tsf and Tsg, and allowing coefficients k1 and k2 to change with different values of confidence index Sc.

In the exemplary implementation illustrated in FIG. 10, a risk potential RP is applied to calculations of both accelerator pedal reaction force regulation and vehicle deceleration regulation. This is just one of many examples that the concepts of this disclosure may be implemented. Another example is using the risk potential RP for only one of the accelerator pedal reaction force control and vehicle deceleration control.

In the exemplary implementation illustrated in FIG. 10, the risk potential RP is determined by the time to collision TTC and time headway THW. The risk potential RP may be determined suing other approaches. For instance, the reciprocal of TTC may be utilized to generate a risk potential RP. In the exemplary implementation illustrated in FIG. 10, the same risk potential RP is used for determining the accelerator pedal reaction force instruction value FA and the vehicle deceleration control instruction value Xg. However, more than one risk potentials RP may be used to implement the system of this disclosure. For instance, two different risk potential RP may be used for determining the accelerator pedal reaction force instruction value FA and the vehicle deceleration control instruction value Xg, respectively. In this case, the risk potential RP for the vehicle deceleration control instruction value Xg must be set accounting for the relationship between the host and the preceding vehicles.

Although the disclosure has been shown and described with respect to the exemplary implementations, it is obvious that equivalent alterations and modifications will occur to those skilled in the art upon reading and understanding of the specification. The present disclosure includes all such equivalent alterations and modifications, and is limited only by the scope of the claims.

What is claimed is:

1. A system for estimating an intention of an operator of a machine comprising:
 a detector configured to detect an operation performed by the operator, wherein the operation may correspond to multiple possible intentions retained by the operator;
 an intention estimation device configured to generate an estimated intention of the operator based on the detected operation; and
 a confidence calculator configured to calculate a confidence index of the estimated intention.

2. The system of claim 1, wherein:
 the intention estimation device includes:
  a first device configured to provide data related to a plurality of imaginary operators, each of the plurality of imaginary operators associated with at least one intention, wherein each of the at least one intention is associated with an operation of the respective imaginary operator;
  a second device configured to calculate a likelihood value for each of the plurality of imaginary operators based on the detected operation of the operator and the respective associated operation of each of the plurality of imaginary operators; and
  a third device configured to generate the estimated intention of the operator based on the respective likelihood value of each of the plurality of imaginary operators; and
 the confidence calculator is configured to calculate the confidence index of the estimated intention based on the respective likelihood value of each of the plurality of imaginary operators.

3. The system of claim 1, wherein the intention estimation device generates the estimated intention of the operator based on the detected operation of the driver and reference data related to predetermined operation patterns.

4. The system of claim 3, wherein the intention estimation device generates the estimated intention by applying one of a support vector machine and a relevance vector machine to data related to the detected operation and the reference data related to the predetermined operation patterns.

5. The system of claim 1 further comprising a control device configured to regulate the operation of an operation device of a the machine based on the confidence index.

6. The system of claim 5, wherein:
the machine is a vehicle;
the operation device is an accelerator pedal of the vehicle or a braking system of the vehicle; and
the control device modifies a reaction force of the accelerator pedal of the vehicle or a deceleration force of the braking system.

7. The system of claim 6 further comprising a risk calculation device configured to calculate a risk potential associated with the vehicle;
wherein the control device regulates the operation device of the vehicle based on the calculated risk potential associated with the vehicle and the confidence index.

8. The system of claim 7, wherein the control device modifies the risk potential based on the confidence index, and regulates the operation of the operation device based on the modified risk potential.

9. The system of claim 7, wherein the control device calculates a regulation amount to regulate the operation of the operation device based on the risk potential, and modifies the calculated regulation amount based on the confidence index.

10. A method for estimating an intention of an operator of a machine comprising the steps of:
detecting an operation performed by the operator, wherein the operation may correspond to multiple possible intentions retained by the operator;
generating an estimated intention of the operator based on the detected operation; and
calculating a confidence index of the estimated intention.

11. The method of claim 10, wherein:
the step of generating an estimated intention includes the steps of:
providing data related to a plurality of imaginary operators, each of the plurality of imaginary operators associated with at least one intention, wherein each of the at least one intention is associated with an operation of the respective imaginary operator;
calculating a likelihood value for each of the plurality of imaginary operators based on the detected operation of the operator and the respective associated operation of each of the plurality of imaginary operators; and
generating the estimated intention of the operator based on the respective likelihood value of each of the plurality of imaginary operators; and
the step of calculating the confidence index calculates the confidence index of the estimated intention based on the respective likelihood value of each of the plurality of imaginary operators.

12. The method of claim 10, wherein the step of generating the estimated intention generates the estimated intention of the operator based on the detected operation of the driver and reference data related to predetermined operation patterns.

13. The method of claim 12, wherein the step of generating the estimated intention generates the estimated intention by applying one of a support vector machine and a relevance vector machine to data related to the detected operation and the reference data related to the predetermined operation patterns.

14. The method of claim 10 further comprising the step of regulating the operation of an operation device of a the machine based on the confidence index.

15. The method of claim 14, wherein:
the machine is a vehicle;
the operation device is an accelerator pedal of the vehicle or a braking system of the vehicle; and
the regulating step modifies a reaction force of the accelerator pedal of the vehicle or a deceleration force of the braking system.

16. The method of claim 15 further comprising the step of calculating a risk potential associated with the vehicle;
wherein the regulating step regulates the operation device of the vehicle based on the calculated risk potential associated with the vehicle and the confidence index.

17. The method of claim 16, wherein the regulating step includes the steps of:
modifying the risk potential based on the confidence index; and
regulating the operation of the operation device based on the modified risk potential.

18. The method of claim 16, wherein the regulating step includes the steps of:
calculating a regulation amount to regulate the operation of the operation device based on the risk potential; and
modifying the calculated regulation amount based on the confidence index.

19. A system for estimating an intention of an operator of a machine comprising:
means for detecting an operation performed by the operator, wherein the operation may correspond to multiple possible intentions by the operator;
means for generating an estimated intention of the operator based on the detected operation; and
means for calculating a confidence index of the estimated intention.

20. A machine-readable medium bearing instructions for calculating an estimated intention of an operator, the instructions, upon execution by a data processing system, causing the data processing system to perform the steps of:
detecting an operation performed by the operator, wherein the operation may correspond to multiple possible intentions retained by the operator;
generating an estimated intention of the operator based on the detected operation; and
calculating a confidence index of the estimated intention.

21. A vehicle comprising:
a detector configured to detect an operation performed by a driver of the vehicle, wherein the operation may correspond to multiple possible intentions retained by the driver;
an intention estimation device configured to generate an estimated intention of the driver based on the detected operation; and
a confidence calculator configured to calculate a confidence index of the estimated intention.

22. The vehicle of claim 21 further including a control the operation of the vehicle based on the confidence index.

* * * * *